United States Patent Office
3,761,331
Patented Sept. 25, 1973

3,761,331

BATH AND METHOD FOR ETCHING ALUMINUM

Robert Milton McClanahan, Allendale, N.J., and Joseph F. Machacek, Long Island City, N.Y., assignors to Philip A. Hunt Chemical Corporation, Palisades, N.J.

No Drawing. Continuation-in-part of abandoned application Ser. No. 801,176, Feb. 20, 1969. This application Oct. 27, 1971, Ser. No. 193,142
Int. Cl. C23f 3/02
U.S. Cl. 156—8 44 Claims

ABSTRACT OF THE DISCLOSURE

A bath and method for chemical machining of aluminum and for etching aluminum printing plates, aluminum circuit boards and other aluminum items at predetermined bare portions (non-imaged areas) thereof unprotected by an etch resist. The bath and method employ aqueous ferric chloride as an etchant, a special composition, i.e. mixture of compounds, to provide a filming agent that acts as an excellent banking agent for the shoulders of the resist-protected portions (imaged areas) and various materials, to wit, sulfuric acid, copper ions and thiocyanate ions to expedite the rate of etch. The filming/banking agent includes a petroleum fraction, a mixture of surfactants and cuprous thiocyanate formed in situ. The bath and method have been found to yield a rate of etch high enough for commercial competition with etching of metal substrates other than aluminum and also to yield a high etch factor and a good shoulder angle so as to permit etched plates to be used for a variety of purposes such, for instance, as printing, embossing, hot stamping and molding.

CROSS-REFERENCE TO RELATED APPLICATION

This application is a continuation-in-part of copending application Ser. No. 801,176, filed Feb. 20, 1969, now abandoned, for "Composition and Method for Etching Aluminum."

BACKGROUND OF THE INVENTION (1) Field of the invention

A system for etching aluminum wherein the shoulders of the imaged areas, are protected by a film/banking agent during etching and wherein an aqueous ferric chloride etching bath includes various compounds to enhance the rate of etching and to enhance the differential etching between the bottom and side walls of non-imaged areas.

(2) Description of the prior art

Patterned etching of metal plates for various purposes is quite well known. Typical patterned etching is performed for items such as printing plates and circuit boards and for chemcial machining. The meatls heretofore most widely used as substrates for patterned etching were copper, zinc and magnesium, and alloys thereof. Aluminum and its alloys (hereinafter jointly referred to as "aluminum"), despite their low cost, availability, lightness and safety, have not been popularly accepted for patterned etching due to various factors which will be pointed out hereinafter.

Generally speaking, one of the problems that concerns the etching industry is that of "etch factor," that being a direct function of the ratio between vertical and lateral etch. The numerical value of etch factor is the depth of vertical etch divided by one-half of the lateral etch. Etch factor is inversely proportioned to "color loss." Color loss is a measurement of the reduction of the imaged resist-protected area of a metal substrate. With a low etch factor and a corresponding high color loss, almost all fine details of an image are lost, inasmuch as the etching bath eats laterally into the edges of the imaged area of the substrate that are supposedly protected by the resist, almost as fast as the bath erodes the non-imaged areas of the plate in depth. As the etch factor improves, i.e., becomes numerically higher, more and more detail is preserved. At an etch factor substantially in excess of 100, fine lines and half-tones maintain their identity in the final etched product even when the same is deeply etched.

It has been known that high etch factors are obtainable in a so-called "powder" etching process for making printing plates. However, this mode of etching is laborious, time-consuming, expensive and requires great skill.

More recently, a "powerless" etching process has come into vogue for use with copper, magnesium and zinc, and their alloys. In tihs process a "filming" agent is added to a liquid etchant to form an etching bath. The filming agent functions to provide a protective film that clings to a bare metallic substrate in the presence of an etchant. The film is characterized by its ability to rupture when struck by droplets of the etching bath impinging thereon substantially perpendicularly to the original surface of the substrate, thereby exposing a metal surface to the action of the etchant which proceeds to attack and erode it. This attack and erosion is immediately followed by reformation of the protective film which again will be broken when fresh droplets of the etching bath strike it in the aforesaid perpendicular direction.

The protective film is further characterized by its resistance to rupture when struck by a droplet of etching bath at an angle substantially varying from the perpendicular. Thereby the side walls of an etched depression, which is gradually formed, are substantially protected from further erosion by the protective film, i.e., banking agent, thus obtaining a high etch factor as a result of differential etching.

Various kinds of filming agents have been used for copper, zinc and magnesium, and their alloys, including filming agents which constitute an oil, conventionally a petroleum fraction, and a surfactant or surfactants. Because the oil is, per se, immiscible with the aqueous etchant used, such etching systems often are referred to as "two-phase" etching systems.

It has been proposed in U.S.L.P. No. 3,402,083 to employ a water-immiscible filming agent for an aluminum etching bath. However, the only filming agent, a petroleum fraction and sulfated or sulfonated castor oil, suggested for aluminum in this patent has two major drawbacks. The first drawback relates closely to the prime function of the filming agent and is that the etched substrate formed with its assistance is not "clean," that is to say, the etched substrate has incomplete etching of non-image areas and pimples (small plateaus) left thereon and, moreover, the etch factor is not sufficiently good insofar as fine details are concerned. This prior aluminum filming agent permitted the etchant to etch laterally under the resist-protected image areas to an extent such that fine half-tone details, serifs and other fine lines of this general nature were obliterated or badly chewed up.

It has also been proposed in German patent application No. 1,814,074 to employ a bath for etching of aluminum and its alloys, which bath is composed of water, a petroleum fraction, ferric iron, a chloride ion and a surfactant constituting a phosphoric acid ester of a polyalkylene glycol. Examples given in this patent application have been tested. It was confirmed in these tests that, as taught by said application, where sulfuric acid was used alone as a purported etchant no etching took place.

The etching baths of said German patent application had a major drawback which is the same as a second major drawback of U.S.L.P. No. 3,402,083. The second drawback is somewhat complex and, to understand it, it is necessary to appreciate the fact that it is not enough for an etching bath simply to etch, to leave clean surfaces and to have a good shoulder, although all of these are desirable. It also is necessary for an etching bath to etch with a rapidity which approaches that of commercial eaching baths employed for the heretofore more commonly used substrates of magnesium, copper and zinc and their alloys.

Copper substrates are currently used on a commercial basis for fine grade printing and circuit boards. The fastest rate of etch that now prevails for copper chemical etching is about 1 mil per minute. This is a comparatively slow rate of etch. However, it is commercially acceptable for copper because certain grades of work need this type of substrate, despite its slow etching rate, to obtain particularly good quality for shoulders and fine lines which are not needed for run-of-the-mill work.

Where a zinc substrate is employed, and zinc substrates presently constitute more than half of the commercially utilized substrates for flat, rotogravure and general commercial printing, the presently obtainable commercial etch rate ranges between 2 and 6 mils per minute. The higher figure is obtained for most flat plates and the lower figure for curved plates and some flat plates. This rate constitutes an industry touchstone and commercial engravers do not like to work with any etch rate which is appreciably lower than that just mentioned for zinc when they are doing commercial work that does not require a copper structure. In the case of the lighter magnesium substrates, which make up most of the balance of the commercial work, the commercial etch rate varies between about 3 and 5 mils per minute.

Despite its many advantages commercial engravers are unwilling to accept aluminum as a substrate if the etch rates which can be attained with it are appreciably lower than those that can be secured commercially with zinc and magnesium; to accept lower etch rates would mean that production costs and rates, and hence their competitive position would be adversely affected.

This necessity of at least matching the etch rates currently obtained with zinc and magnesium constitute the aforesaid second major drawback in connection with the process of U.S.L.P. No. 3,402,083 and the primary drawback in connection with the process of German application Ser. No. 1,814,074. The rate of etch obtained with the bath in U.S.L.P. No. 3,402,083 under the best conditions does not exceed 2 mils per minute. Similarly, in testing of the bath examples of the aforesaid German application, the best rate of etch obtainable was less than 2 mils per minute.

In line with what has been stated above, this low speed of etching is a serious deterrent to the use of aluminum substrates and has, up to the making of the present invention, inhibited the widespread use of aluminum substrates for etching. For a commercially acceptable etching system on aluminum it is necessary that the etch rate be at least 3 mils per minute and preferably higher.

It frequently is necessary to make a fairly deep etch, sometimes for printing and frequently for chemical machining. Typical depths of etch vary with the use to which the substrate is to be put.

Thus, where direct printing plates are to be made—and this is true of all types of substrates whether they be magnesium, copper, zinc or aluminum—a flat plate should have a depth of etch in the range of 35 thousands of an inch. As to the shoulder, the same will be acceptable if moderately undercut, the amount of undercut not exceeding that which would destroy the support for the edge of the imaged portion so that the same will not tend to chip or break. On a flat direct printing plate a high etch factor is required in order to preserve fine lines and half-tones, e.g., up to 150 screen. Indeed, is it in order to secure such a high etch factor that moderate undercutting is acceptable in plates of this type. The undercutting also is acceptable because in these plates there is no possibility of the undercut corner becoming embedded in a matrix as it would be if the plate were used for hot stamping, embossing or the formation of molded printing plates.

Another type of direct printing plate commonly employed is a curved plate which is used in a rotary press. Here, a depth of etch should not be less than 17 thousandths of an inch. A slight amount of undercut is permissible. However, it is desirable not to have the same. As in the case of flat direct printing plates, with a curved direct printing plate the shoulder configuration or smoothness of the shoulder is less important than the etch factor, this because the shoulder never becomes embedded in a matrix.

A third use for etched substrates is as hot stamping or embossing die. In such use the etched die sinks into a matrix such, for instance, as a plastic sheet which is going to be embossed, or a book cover, i.e., a paper matrix, which is intended to have a relief sunk therein. With dies of this nature considerably greater depths are required varying from 20 thousandths to 80 thousandths of an inch. Because the die must sink into a matrix and then release therefrom no undercut can be tolerated. However, the etch factor is no longer as critical because usually these dies will have no fine detail and because as long as the shoulder is not broad, i.e., does not have too flat an angle, the embossment or relief printing is commercially acceptable. It is necessary with such dies to have a smooth shoulder because if the shoulder is rough, portions thereof may become enmeshed in the matrix and the die will not self-release from the matrix after withdrawal at the end of a stamping/embossing operation. Another factor to be considered in connection with this type of die is that the botom wall of the etched portion should be clean, i.e., free of major protuberances, and smooth, i.e., substantially planar, the difference between clean and smooth being one of a different order of magnitudes and of planarity. This, too, is desirable because irregularities, outside of possibly leaving an unfavorable esthetic effect, may tend to catch on the matrix being operated upon and will prevent an immediate separation of the matrix and die upon raising of the die.

A fourth type of etched substrate is a "deep etch plate," also known in the industry as a "box" die. Such a die is used for molding, that is to say, casting, of a plate for box printing. Box dies require a very substantial depth of etch in the order of one-tenth of an inch and deeper. Indeed, 15 hundredths of an inch is not unusual and frequently is desirable. Box dies must not be undercut because if they should be it will be quite difficult to pull molded plates from them. It will be appreciated by those skilled in the molding art that where the material molded is elastomeric, at least to some extent, such as rubber which is used for box printing, a small degree of undercut is permissible since they may be stripped even if the die is undercut. However, frequently in box printing rigid dies are cast such, for example, as hard resins, typically a thermoset resin, e.g., a phenol formaldehyde resin. Quite apparently where the material being molded with the aid of a box die is hard, no undercut can be tolerated and, moreover, the shoulders should be smooth and steep albeit not undercut, as just noted, and the bottom of the etched portion must be clean and smooth.

Special problems exist in connection with deep etched plates. It is highly desirable for the ultimate use to which the molded die is to be put that the depth of the metal etch, as noted previously, be at least one-tenth of an inch. However, when eching in zinc and magnesium substrates it has been commercially impractical to exceed a depth of one-tenth of an inch. When attempts were made to do this by chemical milling undesirable side effects occurred which made the plates unusable. For example, undercutting took place at these depths. Therefore, the trade, needing the additional depth and being unable to obtain it by chemical milling, has resorted to mechanical metal removal, e.g., routing.

Workers in the etching field have understood all of these difficulties and have been making attempts to overcome them principally to obtain a faster etch, a deeper etch, a smoother etch and a good etch factor with aluminum substrates. However, the reaction systems and physical criteria involved are so complex that they have never been fully satisfactorily explained. Hence attempts to improve pattern etching of aluminum have remained an art rather than a science. It is a field in which empiricism still controls.

SUMMARY OF THE INVENTION

(1) Purposes of the invention

It is an object of this invention to provide a bath and method which avoid all of the foregoing drawbacks, to wit, to provide a bath and method pursuant to which aluminum can be etched at rates of at least three thousandths of an inch a minute and considerably higher, preferably at least four thousandths to five thousandths of an inch per minute, which will etch deeply without the necessity of resorting to mechanical metal removal, which will provide a clean, smooth shoulder and a clean and even bottom, an absence of undercut, a high etch factor and a low color loss.

It is another object of the invention to provide a bath and method of the character described which will render the etching of an aluminum substrate competitive on a time and cost basis with the current etching of zinc and magnesium substrates and far superior to current etching of copper substrates.

It is another object of the invention to provide a bath and method of the character described which incorporate an admixture of compounds that have been determined empirically to provide the aforesaid desirable effects.

It is another object of the invention to provide a bath and method of the character described which incorporate in the filming agent a special compound formed in place that has been determined to provide a most desirable banking action, thereby inhibiting undercutting and increasing etch factor while at the same time permitting the use of high rates of etch which, without this banking agent, would greatly reduce etch factor and increase color loss to the point that many plates, particularly those supposedly having fine detail, would be unusable.

It is another object of the invention to provide a bath and method of the character described which will yield a high etch factor, e.g., substantially in excess of 50, for the etching of an aluminum substrate.

It is another object of the invention to provide a bath and method of the character described which will permit the etching of fine half-tone and fine lines on aluminum printing plates.

Other objects of the invention in part will be obvious and in part will be pointed out hereinafter.

(2) Brief description of the invention

Essentially, the present invention constitutes the provision and use of a bath for etching an aluminum substrate. As implied earlier, the term "aluminum" as used herein is one of a generic connotation which includes essentially pure aluminum, to wit, aluminum with unavoidable impurities and aluminum alloys such as various alloys of aluminum with silicon, iron, copper, manganese, zinc, beryllium, magnesium, chromium and/or tin. The amount of alloying materials should not exceed 16% by weight of the aluminum alloy. By way of example, the following constitutes the compositions of typical aluminum substrates used for printing, hot stamping and embossing, and box dies. The identification numbers of the different alloys are those of The Aluminum Company of America:

| Identification Number | Si | Fe | Cu | Mn | Zn | Be | Mg | Cr | Sn | Miscellaneous impurities |
|---|---|---|---|---|---|---|---|---|---|---|
| 1100 | 1.00 | | 0.20 | 0.05 | 0.10 | 0.05 | ---- | ---- | ---- | 0.15 |
| 2219 | 0.20 | 0.30 | 5.80–6.80 | 0.20–0.40 | 0.10 | ---- | 0.02 | ---- | 0.02–0.10 | 0.15 |
| 3003 | 0.60 | 0.70 | 0.20 | 1.00–1.50 | 0.10 | 0.05 | ---- | ---- | ---- | 0.15 |
| 5005 | 0.40 | 0.70 | 0.20 | 0.20 | 0.25 | ---- | 0.50–1.10 | 0.10 | ---- | 0.15 |
| 5252 | 0.45 | | 0.10 | 0.10 | 0.10 | 0.05 | 2.20–2.80 | 0.15–0.35 | ---- | 0.15 |
| 6061 | 0.40–0.80 | 0.70 | 0.15 | 0.15 | 0.25 | ---- | 0.80–1.20 | 0.15–0.35 | 0.15 | 0.15 |
| 6063 | 0.20–0.60 | 0.35 | 0.10 | 0.10 | 0.10 | ---- | 0.45–0.90 | 0.10 | 0.10 | 0.15 |
| 7072 | 0.70 | | 0.10 | 0.10 | 0.80–1.30 | ---- | 0.10 | ---- | ---- | 0.15 |
| 7178 | 0.50 | 0.70 | 1.60–2.40 | 0.30 | 6.30–7.30 | ---- | 2.40–3.10 | 0.18–0.40 | 0.20 | 0.15 |

NOTE.—Balance aluminum.

The bath is a two-phase bath and includes (1) a large amount of water. The active etching agent includes (2) ferric chloride, see subsequent Equation I. As is common in the trade, the ferric chloride and water are jointly considered as an aqueous ferric chloride solution and the strength thereof will be denoted in grams/liter of bath.

Additionally, the etching agent desirably includes (3) sulfuric acid. It is believed that a principal function of the sulfuric acid, pursuant to a reaction mechanism which is presently thought to prevail, see subsequent Equations II, IV and VII, is to accelerate the rate of etching in the presence of a cupric ion and a thiocyanate ion. It has also been empirically determined that the presence of the sulfuric acid steepens the shoulder angle, a most desirable effect, thereby avoiding the formation of a broad shoulder. It is presently theorized that an auxiliary banking agent employed, cuprous thiocyanate, which soon will be described, tends to be attacked by the sulfuric acid, thus lessening, although not destroying, its efficacy, and for this reason it is believed that the shoulder angle is brought closer to a perpendicular to the imaged (resist-protected surface.

The bath further includes (4) a petroleum fraction together with a mixture of surfactants. The combination of the petroleum fraction and the surfactant mixture forms a filming agent which, when applied to a non-imaged aluminum area in the presence of an aqueous ferrous chloride etchant, creates a thin film clinging to said area that will protect such area from the erosion of the etchant.

This thin film is characterized by its ability to be ruptured when impinged upon by droplets of the etching bath in an etching machine. The rupturability of the film is, among other things, influenced by the angle at which the bath droplets strike the film, the film being more readily ruptured when struck substantially perpendicularly by such droplets and tending to maintain its integrity when struck a glancing blow by the droplets. Thus, when the film is present on a surface which is parallel to the original surface of the aluminum substrate it is ruptured readily in an etching machine by perpendicularly travelling bath droplets, whereas the same film present on a shoulder is not so ruptured and there functions as a banking agent.

However, where high rates of etch are to be achieved, and these are secured by the incorporation, among other things, of the sulfuric acid in the bath, there is a marked tendency for the etching bath to destroy the integrity of the aforesaid banking film. Hence, further pursuant to the present invention, there is additionally included in the bath an auxiliary banking agent in the form of cuprous thiocyanate which increases the etch factor and lowers color loss—an important desideratum under any conditions, and particularly important when high etch rates prevail. Cuprous thiocyanate exists as a somewhat gelatinous material in an aqueous ferric chloride bath. It is essentially water insoluble. Therefore, cuprous thiocyanate cannot simply be added to the bath as such, but must be formed in situ at the metal surface and, pursuant to the invention, is thus created by the inclusion in the bath of cupric ions and thiocyanate ions. The cupric ions are reduced to cuprous form in the reaction mechanism subsequently described at Equation II, and which effects etching. The cuprous ions react with the thiocyanate ions to form cuprous thiocyanate at the metal surface at which time the cuprous thiocyanate becomes a part of the filming agent. The cupric ions and thiocyanate ions are introduced in the bath in the form of (5) water soluble cupric salts and (6) water soluble thiocyanate salts such, for instance, as cupric chloride and ammonium thiocyanate. The cupric salts and the thiocyanate salts are, per se, a part of the etchant.

The mixture of surfactants heretofore mentioned preferably includes a phosphorylated ethoxylated ester—an anionic surfactant—to wit, (7) an ester of orthophosphoric acid and a compound selected from the group consisting of ethoxylated aliphatic alcohols and ethoxylated alkyl phenols; and (8) an ethoxylated amine or diamine—a cationic surfactant.

The surfactants also may include the following, depending upon the type of use to which the aluminum substrate is to be put after etching and depending upon the type of physical characteristics desired in the etched substrate; (9) a fatty amine—a cationic surfactant; (10) a sulfonated anionic surfactant such as a petroleum sulfonate; (11) an alkyl quaternary fatty amine—a cationic surfactant; and (12) a fatty carboxylic acid—an anionic surfactant.

Optionally, the etching bath further includes (13) a glycol ether as a solubilizer.

Finally, the bath includes (14) hydrochloric acid as an ingredient of the etchant.

Mention should be made of the fact that, although the use of sulfuric acid is highly desirable for obtaining a high etch rate and maintaining a steep shoulder, if an engraver will accept a slower etch rate sulfuric acid may be omitted. However, even then it is most desirable to use sulfuric acid as a replenishing agent in a bath and method for etching aluminum. As such an agent it performs two functions, to wit, it tends to maintain the original etch rate which decreases over a period of use and it also maintains a steep shoulder, the shoulder angle tending to deteriorate and provide a broader shoulder during the extended use of a bath which is not so replenished.

Physically and from a machine point of view the etching steps performed on an aluminum substrate are the same as those performed on copper, magnesium and zinc substrates except for the use of the improved bath.

A typical method constitutes coating the substrate with a photosensitive film such, for instance, as a polyvinyl cinnamate incorporating an actinic sensitizer. The polyvinyl cinnamate film is soluble in certain solvents. However, when exposed to light, the light struck areas become solvent insoluble. The insoluble form of the film is not attacked by an etching bath or any of the constituents thereof. After the photosensitive film has been thus exposed, it is developed with a suitable solvent that does not remove the insolubilized portions of the film, thereby leaving an etch-resistant image on the substrate and exposing the remaining surface of the substrate (non-imaged areas) as bare metal.

To increase the resistance of the insolubilized remaining imaged areas to attack by the etching bath, it is conventional and desirable to heat treat the film and substrate, e.g., to a temperature of 390° F.

Next, the plate with its imaged etch resist is subjected to an etching operation which conventionally is done by a paddle, splash or a spray etcher. In the paddle etcher the plate is suspended over an etching bath with its resist-carrying surface facing the bath. Paddles rotate in the bath, first dipping in the bath and then lifting above it at which time droplets of the etching bath raised by the paddles are flung against the plate. A typical etching machine is Master Etching Machine Co. etcher Model No. M–32, wherein 6" to 10" paddles turn at 550 r.p.m. and dip into the etching bath approximately ⅝". Another type of etcher well known to the art is a splash etcher machine, and still another is a spray etcher.

The exposed surface of the aluminum plate, i.e., the portion not protected by the etch resist, is thus subjected to impingement of droplets of the etching bath. The etching mechanism starts at the exposed surface of the substrate by attack of aqueous ferric chloride in the presence of sulfuric acid and copper ions. The etching reaction, the mechanism of which is, so far as is presently understood, set forth hereinafter, dissolves aluminum at the exposed surface to leave a fresh aluminum surface. The filming agent immediately forms a film over the exposed surface. When the next droplet of the etching bath strikes this film it will, if it strikes the bottom of the etched depression, disintegrate the film and permit fresh etching to take place. However, at the sides of the depression the filming agent acts as a banking agent and prevents lateral etching to a very substantial degree whereby a differential etching is secured which proceeds apace in a direction perpendicular to the original surface of the substrate, but proceeds very slowly in a lateral direction. As has been observed briefly above, the cuprous thiocyanate heightens the banking effect and, hence, permits a high rate of etch to be achieved without substantially degrading the etch factor or color loss.

The copper and thiocyanate ions also accelerate the rate of etch, the copper directly and the thiocyanate indirectly by preventing plating of copper metal at the surface of the metal substrate.

The invention accordingly consists in the baths and series of steps which will hereinafter be described and of which the scope of application will be indicated in the appended claims.

PREFERRED EMBODIMENTS OF THE INVENTION

The primary etchant of a bath embodying the present invention is iron chloride in water. The grams per liter of the ferric chloride in water solution may range from a low of about 160 of anhydrous ferric chloride to the maximum solubility of ferric chloride in water which at 30° C., a typical temperature for an etching bath, is 975. Preferably there is employed from about 175 to 450 gms. of ferric chloride (on an anhydrous basis) per liter at a bath temperature of about 30° C. plus or minus about 10° C. With the preferred inclusion of sulfuric acid the higher the temperature the greater the speed of etch; however over 30° C. the shoulders and the bases of the etched portions are not as smooth and even, so that 30° C. plus or minus 2° C. is a preferred range for high speed etching. The amount of ferric chloride (on an anhydrous basis) should never be less than 150 gms. per liter of bath. Where less ferric chloride is present etching proceeds at too slow a rate or is so slight as to be almost unobservable.

The ferric chloride water solution constitutes an aqueous phase of the etching bath. However, the etching bath is a multi-phase, specifically two-phase, bath, the other phase constituting a filming agent that includes as a first constituent a water immiscible liquid which largely is made up of a petroleum fraction together with sundry additives that will be discussed in detail hereinafter.

The petroleum fraction is predominantly aromatic. Preferably the petroleum fraction includes from 60% to 100% by volume of one or more aromatic constituents, the balance being aliphatic petroleum fractions made up of one or more constituents. The boiling point of all petroleum fractions used should be at least 150° C. Typical examples of aromatic petroleum fractions usable in accordance with the present invention are:

| Name of petroleum fraction | Specific gravity at 60° F. | Distillation characteristics IBP, ° F. | 50%, ° F. | Dry end pt., ° F. | Flash pt., ° F. TCC | KB, cc. | Mixed aniline cloud pt., ° F. |
|---|---|---|---|---|---|---|---|
| Amsco Hi-Flash naphtha | 0.8692 | 312 | 328 | 361 | 108 | 87.5 | 65.0 |
| Amsco solvent G | 0.8927 | 362 | 375 | 414 | 143 | 89.0 | 62.5 |
| Amsco solvent E-98 | 0.9718 | 398 | 441 | 493 | [1]176 | +105 | 57.5 |
| Amsco solvent H-CC | 0.9646 | 496 | 560 | | [1]240 | | 102.5 |
| Amsco solvent H-J | 0.9986 | 505 | 542 | | [1]250 | | 56.0 |
| Amsco solvent H-SB | 0.9328 | 355 | 455 | 530 | 154 | +105 | 76.0 |
| Diethyl benzene | 0.8641 | [2]183.4 | | | 135 | | |

[1] PMCC.
[2] Degrees Centigrade.

As intimated above, any single one of these solvents can be used as the aromatic constituent or, instead, blends thereof can be employed.

Typical aliphatic hydrocarbons which can be mixed with the aromatic solvents in the foregoing manner are:

| Name | API gravity at 60° F. | Specific gravity at 60° F. | Distillation characteristics IBP, ° F. | 50%, ° F. | Dry end pt., ° F. | Flash pt., ° F. TCC | KB, cc. | Aniline cloud pt., ° F. |
|---|---|---|---|---|---|---|---|---|
| Amsco napthol spirits | 53.5 | 0.7649 | 310 | 320 | 335 | 102 | 34.1 | 142.0 |
| Amsco mineral spirits | 48.6 | 0.7857 | 313 | 339 | 386 | 104 | 37.4 | 132.0 |
| Amsco odorless mineral spirits | 54.5 | 0.7608 | 352 | 365 | 386 | 125 | 27.0 | 184.5 |
| Amsco 140 solvent | 49.1 | 0.7835 | 364 | 374 | 399 | 142 | 32.3 | 150.0 |
| Amsco 460 solvent | 41.5 | 0.8179 | 375 | 401 | 445 | 150 | 38.8 | 130.5 |
| Amsco odorless 450 solvent | 51.6 | 0.7728 | 300 | 420 | 457 | 165 | 24.8 | 194.0 |

All of the aliphatic hydrocarbons and the aromatic solvents listed above are sold by American Mineral Spirits Co.

The liquid petroleum fraction provides good results when present in amounts ranging from about 40% to about 95% by volume of the filming agent; a preferred range for the petroleum fraction is from about 40% to about 70% by volume of the filming agent. (The term "filming agent" as used in this context includes all constituents of the filming agent these being the water immiscible liquid, the surfactants, and the glycol ether, if any; the sulfuric acid, the water soluble cupric salt and the water soluble thiocyanate salt are considered to be a part of the etchant.)

As just noted, the constitution of the petroleum fraction is principally aromatic with optional inclusion of aliphatic segments. This holds true for most commercial applications. However, under certain special conditions, as will be seen later in the examples, it is within the ambit of the invention to employ a petroleum fraction which is predominantly or even solely made up of an aliphatic constituent or blended aliphatic constituents.

The amount of aromatic petroleum fraction employed can range as widely as from about 40% to about 95% by volume of the filming agent, with the preferred range being from about 40% to about 70% by volume of the filming agent.

As to the aliphatic solvent, it can range from about 0% to about 95% by volume of the filming agent. The preferred range will vary depending upon the end use of the etched aluminum substrate. For example, where a curved direct printing aluminum plate is to be etched, the preferred range for the aliphatic solvent is from about 0% to about 20% by volume of the filming agent. For etched aluminum substrates to be used as stamping dies, the preferred range of aliphatic solvent is from about 0% to about 35% by volume of the filming agent, and for deep etched aluminum substrates the preferred range is from about 5% to about 35% by volume of the filming agent.

One of the preferable surfactants in the filming agent is an ester of orthophosphoric acid and a compound selected from the group consisting of ethoxylated aliphatic alcohols and ethoxylated alkyl phenols which is a member of the series of phosphorylated ethoxylated aliphatic alcohols and alkyl phenols, being a mixture of mono- and di-phosphate esters, having the formula

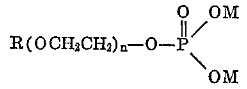

for the mono-phosphate ester, and the formula

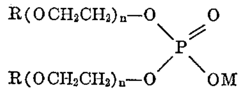

for the di-phosphate ester, where R is a member selected from the group consisting of alkyl phenol residues and aliphatic alcohol residues in which the non-aromatic portions thereof have from 8 to 24 carbon atoms, preferably are saturated, and are branched and unbranched, M is H, Na, K or $NH_3$, and $n$ is an integer from 1 to 20.

There may be employed either the mono- or di-phosphate ester or mixtures thereof in any proportions.

The ethoxylation should be between 40% and 90% and preferably is between 60% and 70%.

Typical examples of phenols which are employed are nonyl phenols and dinoyl phenols. Typical alcohols that may be employed are dodecyl alcohol and tridecyl alcohol. In the preferred form of the invention, R is a residue of tridecyl alcohol.

Specific examples of such phosphorylated ethoxylated esters are (1) a mixture of the free acid forms of mono- and di-phosphate esters of ethoxylated tridecyl alcohol, commercially available from GAF as Gafac RS 610 which has a 60% to 70% ethoxylation, (2) a mixture of the free acid forms of mono- and diphosphate esters of ethoxylated nonyl phenol which has a 60% to 70% ethoxylation, sold as Gafac RE 610, and, (3) a mixture of the free acid forms of mono- and di-phosphate esters of ethoxylated dinonyl phenol which has a 60% to 70% ethoxylation, commercially available from Wayland Chemical Company as Wayfos M 60.

Other satisfactory materials are mixtures of the free acid forms, and sodium, potassium and ammonium salts of mono- and di-phosphate esters of ethoxylated nonyl phenol, ethoxylated dinonyl phenol, and ethoxylated dodecyl alcohol.

Other satisfactory commercial compounds are Wayfos 6TD and Wayfos TD60.

These esters provide good results when present in amounts ranging from about 3% to about 25% by weight of the filming agent, the preferred range being from about 3% to about 10% by weight of the filming agent.

The presence of the phosphate esters extends the useful life of the aqpeous ferric chloride aluminum etching bath. It is believed that this is due to the fact that this anionic surfactant does not decompose under the highly acidic conditions prevailing as do surfactants such as sulfonated castor oil which have been proposed before for use as surfactants in a filming agent in a metal etching bath. The phosphate ester is believed to increase the adhesive attraction of the liquid petroleum fraction to the metal substrate this fraction being the major ingredient of the filming agent. The ester may also contribute to the emulsification of the petroleum fraction. It further is believed that such ester is the major factor in producing a clean etch; it also is believed that said ester assists in maintaining the shoulders smooth.

The second preferable additive to the petroleum fraction in order to make up a satisfactory ferric chloride etching bath for an aluminum substrate is a polyethoxylated amine, this being a polyethoxylated mono- or diamine having the formula

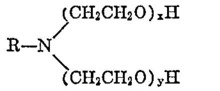

for the polyethoxylated monoamine, where $x+y$ is an integer ranging from 2 to 50 and where R is an alkyl group having from 8 to 18 carbon atoms in the carbon chain, which preferably is unbranched, and which usually is a mixture of saturated and unsaturated groups as is common in naturally occurring products, and the formula

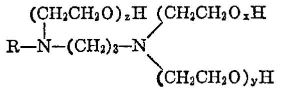

for the polyethoxylated diamine, where $x+y+z$ is an integer ranging from 3 to 80 and preferably is from 3 to 15, R being the same as defined for the polyethoxylated monoamine.

Specific examples of such polyethoxylated amines are the ethylene oxide condensation products of N-tallow trimethylene diamine, commercially available from Armour Industrial Chemical Co. as Ethoduomeen T25 which is a diamine wherein $x+y+z$ is 15, Ethoduomeen T20 a diamine wherein $x+y+z$ is 10, and Ethoduomeen T13 a diamine wherein $x+y+z$ is 3.

Other satisfactory polyethoxylated amines are stearyl polyethoxylated amines having $x+y$ from 2 to 50, soya bean polyethoxylated amines having $x+y$ from 2 to 15, oleyl polyethoxylated amines having $x+y$ from 2 to 5, coco polyethoxylated amines having $x+y$ from 2 to 15, and tallow polyethoxylated amines having $x+y$ from 2 to 15, all commercially available from Armour Industrial Chemical Company under the name of Ethomeens.

These polyethoxylated amines provide good results when present in amounts ranging from about 1% to about 20% by weight of the filming agent, the preferred range being from about 2% to about 10% by weight of the filming agent.

The presence of the polyethoxylated amines is believed to increase the surface active properties of the protective film formed by the filming agent.

Turning now to the optional ingredients of the filming agent, the first of these to be mentioned is a fatty amine. This is a compound selected from the broup consisting of primary fatty amines, secondary fatty amines and tertiary fatty amines, the amines being both saturated and unsaturated, primary fatty amines being preferred. The fatty amine has the formula

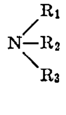

where $R_1$ is a member selected from the group consisting of an unbranched alkyl group containing from 8 to 18 carbon atoms in the carbon chain, and each of $R_2$ and $R_3$ is a member selected from the group consisting of H, $CH_3$ an unbranched alkyl group containing from 8 to 18 carbon atoms in the carbon chain and butyric acid.

A specific example of such a fatty amine is distilled octyl amine, commercially available from Armour Industrial Chemical Company as Armeen 8D.

Other satisfactory materials are dodecyl amine, hexadecyl amine, octadecyl amine, decyl amine, tallow amine, di-N-octyl amine, tri - N - octyl amine, dimethyl dodecyl amine, methyl dihydrogenated tallow amine, dicoco amine, dihydrogenated tallow amine and N-coco beta amino butyric acid.

These fatty amines provide good results when present in amounts ranging from about 0% to about 3% by weight of the filming agent, the preferred range being from about 0% to about 1% by weight of the filming agent.

The presence of the fatty amines is believed to increase the protective properties of the liquid petroleum fraction.

The second additive to the filming agent of the optional category is a sulfonated anionic surfactant. This additive is present or not present principally as a function of the type of aluminum substrate to be etched, that is to say, it is not necessary although it is useful on curved plates. It is highly desirable to have the same present in deeply etched plates or for flat plates although, as is clear from the foregoing, its use is not absolutely necessary for any of the plates or other types of etching uses. The preferred type of anionic sulfonated surfactant is a sulfonated petroleum oil (a petroleum sulfonate), this being a compound having the formula $$RSO_3X$$

where X is selected from the group consisting of alkali metals and alkali earth metals, and R is a heterogeneous mixture of aliphatic and aromatic naturally occurring hydrocarbons. For a fuller definition reference is made to ASTM Report No. 224 (1957) by Brown & Noblack.

Typical examples of petroleum sulfonates are the Petronates and Dipetronates, manufactured by the Sonneborn Division of Witco Chemical Company, Inc., and the Petrosuls manufactured by Pennsylvania Refining Co., these sulfonated petroleum oils being further identified as follows:

PETRONATE L

Typical analysis:
- Molecular weight—415/430
- Sulfonates—62.0% by weight
- Mineral oil—33.0% by weight
- Inorganic salt—0.5% by weight
- Water—4.5% by weight
- Free alkalinity—2.0 mg. KOH/g.
- Combined alkalinity—2.0 mg. KOH/g.

Typical properties:
- Specific gravity at 60° F.—1.02
- Weight per gallon at 60° F.—8.5 lbs.
- Furol viscosity at 210° F.—125
- Flash point—380° F.
- Fire point—415° F.
- Lovibond color, ½" cell (10% in white oil)—3R
- Emulsion test—10 cc. of a 10% solution of Petronate L in white mineral oil emulsifies readily with 100 cc. distilled water to form stable emulsions.

Typical properties of oil-free Petronate L:
- The following typical properties are determined on the dry, oil-free sulfonate obtained from Petronate L by suitable de-oiling and dehydration:
  - Empiric formula—$C_{24}H_{38}SO_3Na$
  - Molecular weight—429
  - $SO_3$ content (combined)—18.6% by weight
  - Ash content ($Na_2SO_4$)—16.5% by weight Wetting test-draves method:
  1% aqueous dispersion—wetting time 9 seconds re-wetting time 8 seconds
Surface tension at 77° F.:
  1.0% aqueous concentration—35/40 dynes/cm.
  0.1% aqueous concentration—38/42 dynes/cm.
Solubility:
  Water: 1–2% by weight—dispersible in any concentration
  Alcohols, Ketones, Esters, Chlorinated hydrocarbons, Aromatic hydrocarbons, Mineral oils — Soluble

PETRONATE HL

Typical analysis:
  Molecular weight—440/470
  Sulfonates—62.0% by weight
  Mineral oil—32.5% by weight
  Inorganic salt—0.5% by weight
  Water—5.0% by weight
  Free alkalinity—2.0 mg. KOH/g.
  Combined alkalinity—2.0 mg. KOH/g.
Typical properties:
  Specific gravity at 60° F.—1.02
  Weight per gallon at 60° F.—8.50 lbs.
  Furol viscosity at 210° F.—135
  Flash point—380° F.
  Fire point 415° F.
  Lovibond color, ½" cell (10% in white oil)—4.5 R
  Emulsion test—10 cc. of a 10% solution of Petronate in white mineral oil emulsifies readily with 100 cc. distilled water to form a stable emulsion.
Typical properties of oil-free Petronate HL:
  The following typical properties are determined on the dry, oil-free sulfonate obtained from Petronate HL by suitable de-oiling and dehydration:
    Empiric formula—$C_{26}H_{42}SO_3Na$
    Molecular weight—457
    $SO_3$ content (combined)—17.5% by weight
    Ash content ($Na_2SO_4$)—15.5% by weight
Wetting test-draves method:
  1% aqueous dispersion—wetting time 9 seconds; re-wetting time 8 seconds
Surface tension at 77° F.:
  1.0% aqueous concentration—35/40 dynes/cm.
  0.1% aqueous concentration—38/42 dynes/cm.
Solubility:
  Water: 1–2% by weight—dispersible in any concentration
  Alcohols, Ketones, Esters, Chlorinated hydrocarbons, Aromatic hydrocarbons, Mineral oils — Soluble

PETRONATE K

Molecular weight—420/450
  Sulfonates—62.0% by weight
  Mineral oil—32.5% by weight
  Inorganic salt—0.5% by weight
  Water—5.0% by weight
  Free alkalinity—2.0 mg. KOH/g.
  Combined alkalinity—2.0 mg. KOH/g.
Typical analysis:
  Specific gravity at 60° F.—1.00
  Weight per gallon at 60° F.—8.33 lbs.
  Furol viscosity at 210° F.—85
  Flash point—380° F.
  Fire point—415° F.
  Lovibond color, ½" cell (10% in white oil)—0.7R
  Emulsion test—10 cc. of a 10% solution of Petronate K in white mineral oil emulsifies readily with 100 cc. distilled water to form stable emulsions.

Typical properties of oil-free Petronate K:
  The following typical properties are determined on the dry, oil-free sulfonate obtained from Petronate K by suitable de-oiling and dehydration:
    Empiric formula—$C_{25}H_{36}SO_3Na$
    Molecular weight—439
    $SO_3$ content (combined)—18.1% by weight
    Ash content ($Na_2SO_4$)—15.5% by weight
Wetting test-draves method:
  1% aqueous dispersion—wetting time 9 seconds; re-wetting time 8 seconds
Surface tension at 77° F.:
  1.0% aqueous concentration—35/40 dynes/cm.
  0.1% aqueous concentration—38/42 dynes/cm.
Solubility:
  Water: 1–2% by weight—dispersible in any concentration
  Alcohols, Ketones, Esters, Chlorinated hydrocarbons, Aromatic hydrocarbons, Mineral oils — Soluble

PETRONATE CR

Typical analysis:
  Molecular weight—490/510
  Sulfonates—62.0% by weight
  Mineral oil—32.5% by weight
  Inorganic salts—0.5% by weight
  Water—5.0% by weight
  Free alkalinity—2.0 mg. KOH/g.
  Combined alkalinity—2.0 mg. KOH/g.
Typical properties:
  Specific gravity at 60° F.—1.04
  Weight per gallon at 60° F.—8.60 lbs.
  Furol viscosity at 210° F.—175
  Flash point—380° F.
  Firepoint—415° F.
  Lovibond color ½" cell (10% in white oil)—4R
  Emulsion test—10 cc. of a 10% solution of Petronate CR in white mineral oil emulsifies readily with 100 cc. distilled water to form a stable emulsion.
Typical properties of oil-free Petronate CR:
  The following typical properties are determined on the dry, oil-free sulfonate obtained from Petronate CR by suitable de-oiling and dehydration:
    Empiric formula—$C_{30}H_{50}SO_3Na$
    Molecular weight—500
    $SO_3$ content (combined)—15.6% by weight
    Ash content ($Na_2SO_4$)—13.8% by weight
Wetting test-draves method:
  1% aqueous dispersion—wetting time 9 seconds; re-wetting time 8 seconds
Surface tension at 77° F.:
  1.0% aqueous concentration—35/40 dynes/cm.
  0.1% aqueous concentration—38/42 dynes/cm.
Solubility:
  Water: 1–2% by weight—dispersible in any concentration
  Alcohols, Ketones, Esters, Chlorinated hydrocarbons, Aromatic hydrocarbons, Mineral oils — Soluble

DI-PETRONATE L

Typical analysis:
  Molecular weight—415/430
  Sulfonates—52.0 %by weight

DI-PETRONATE L—Continued

Typical aanlysis:
- Mineral oil—44.8% by weight
- Inorganic salt—0.4% by weight
- Water—3.8% by weight
- Free alkalinity—1.7 mg. KOH/g.
- Combined alkalinity—1.7 mg. KOH/g.

Typical properties:
- Specific gravity at 60° F.—0.987
- Weight per gallon at 60° F.—8.22 lbs.
- Furol viscosity at 210° F.—50
- Flash point—380° F.
- Fire point—415° F.
- Lovibond color, ½" cell (10% in white oil)—2½R
- Emulsion test—10 cc. of a 10% solution of Di-Petronate L in white mineral oil emulsifies readily with 100 cc. distilled water to form a stable emulsion.

Typical properties of oil-free Di-Petronate L:
- The following typical properties are determined on the dry, oil-free sulfonate obtained from Di-Petronate L by suitable de-oiling and dehydration:
- Empiric formula—$C_{24}H_{38}SO_3Na$
- Molecular weight—425
- $SO_3$content (combined)—18.6% by weight
- Ash content ($Na_2SO_4$)—16.5% by weight Wetting test-draves method:
- 1% aqueous dispersion—wetting time 9 seconds; re-wetting time 8 seconds Surface tension at 77° F.
- 1.0% aqueous concentration—35/40 dynes/cm.
- 0.1% aqueous concentration—38/42 dynes/cm.

Solubility
- Water: 1–2% by weight—dispersible in any concentration
- Alcohols, Ketones, Esters, Chlorinated hydrocarbons, Aromatic hydrocarbons, Mineral oil — Soluble

DI-PETRONATE HL

Typical analysis:
- Molecular weight—440/470
- Sulfonates—52.0% by weight
- Mineral oil—44.1% by weight
- Inorganic salt—0.4% by weight
- Water—3.5% by weight
- Free alkalinity—1.7 mg. KOH/g.
- Combined alkalinity—1.7 mg. KOH/g.

Typical properties:
- Specific gravity at 60° F.—0.987
- Weight per gallon at 60° F.—8.22 lbs.
- Furol viscosity at 210° F.—60
- Flash point—380° F.
- Fire point—415° F.
- Lovibond color, ½" cell (10% in white oil)—3R
- Emulsion test—10 cc. of a 10% solution of Di-Petronate HL in white mineral oil emulsifies readily with 100 cc. distilled water to form a stable emulsion.

Typical properties of oil-free Di-Petronate HL:
- The following typical properties are determined on the dry, oil-free sulfonate obtained from Di-Petronate HL by suitable deoiling and dehydration:
  - Empiric formula—$C_{26}H_{42}SO_3Na$
  - Molecular weight—457
  - $SO_3$ content (combined)—17.5% by weight
  - Ash content ($Na_2SO_4$)—15.5% by weight Wetting test-draves method:
- 1% aqueous dispersion—wetting time 9 seconds; re-wetting time 8 seconds Surface tension at 77° F.:
- 1.0% aqueous concentration—35/40 dynes/cm.
- 0.1% aqueous concentration—38/42 dynes/cm.

Solubility:
- Water: 1–2% by weight—dispersible in any concentration.
- Alcohols, Ketones, Esters, Chlorinated hydrocarbons, Aromatic hydrocarbons, Mineral oil — Soluble

DI-PETRONATE K

Typical analysis:
- Molecular weight—420/450
- Sulfonates—52.0% by weight
- Mineral oil—44.1% by weight
- Inorganic salt—0.4% by weight
- Water—3.5% by weight
- Free alkalinity—1.7 mg. KOH/g.
- Combined alkalinity—1.7 mg. KOH/g.

Typical properties:
- Specific gravity at 60° F.—0.987
- Weight per gallon at 60° F.—8.22 lbs.
- Furol viscosity at 210° F.—35
- Flash point—380° F.
- Fire point—415° F.
- Lovibond color, ½" cell (10% in white oil)—0.7R
- Emulsion test—10 cc. of a 10% solution of Di-Petronate K in white mineral oil emulsifies readily with 100 cc. distilled water to form a stable emulsion.

Typical properties of oil-free Di-Petronate K:
- The following typical properties are determined on the dry, oil-free sulfonate obtained from Di-Petronate K by suitable deoiling and dehydration:
  - Empiric formula—$C_{26}H_{40}SO_3Na$
  - Molecular weight—435
  - $SO_3$ content (combined)—18.1% by weight
  - Ash content ($Na_2SO_4$)—16.0% by weight Wetting test-draves method:
- 1% aqueous dispersion—wetting time 9 seconds; re-wetting time 8 seconds Surface tension at 77° F.:
- 1.0% aqueous concentration—35/40 dynes/cm.
- 0.1% aqueous concentration—38/42 dynes/cm.

Solubility:
- Water: 1–2% by weight—dispersible in any concentration
- Alcohols, Ketones, Esters, Chloroinated hydrocarbons, Aromatic hydrocarbons, Mineral oils — Soluble

DI-PETRONATE CR

Typical analysis:
- Molecular weight—490/510
- Sulfonates—52.0% by weight
- Mineral oil—44.1% by weight
- Inorganic salt—0.4% by weight
- Water—3.5% by weight
- Free alkalinity—1.7 mg. KOH/g.
- Combined alkalinity—1.7 mg. KOH/g.

Typical properties:
- Specific gravity at 60° F.—0.987
- Weight per gallon at 60° F.—8.22 lbs.
- Furol viscosity at 210° F.—80
- Flash point—380° F.
- Fire point—415° C.
- Lovibond color, ½" cell (10% in white oil)—4R
- Emulsion test—10 cc. of a 10% solution of Di-Petronate CR in white mineral oil emulsifies readily with 100 cc. distilled water to form a stable emulsion.

Typical properties of oil-free Di-Petronate CR:
- The following typical properties are determined on the dry, oil-free sulfonate obtained from Di-Petronate CR by suitable deoiling and dehydration:

Empiric formula—$C_{30}H_{50}SO_3Na$
Molecular weight—500
$SO_3$ content (combined)—15.6% by weight
Ash content ($Na_2SO_4$)—13.8% by weight Wetting test-draves method:
1% aqueous dispersion—wetting time 9 seconds; rewetting time 8 seconds Surface tension at 77° F.:
1.0% aqueous concentration—35/40 dynes/cm.
0.1% aqueous concentration—38/42 dynes/cm.

Solubility:
Water: 1–2% by weight—dispersible in any concentration
Alcohols, Ketones, Esters, Chlorinated hydrocarbons, Aromatic hydrocarbons, Mineral oils — Soluble

BASIC CALCIUM PETRONATE

Typical analysis:
Base number—25 mg. KOH/g.
Calcium sulfonate—45.0% by weight
Calcium—3.0% by weight
Water—0.5% by weight
Chlorine—0.25% by weight
Sodium—0.10% by weight
Molecular weight
As sodium—450
As calcium—892

Typical properties:
Specific gravity at 60° F.—0.9820
Weight per gallon at 60° F.—8.18 lbs.
Saybolt viscosity at 210° F.—170
Flash point—360° F.
Fire point—390° F.
ASTM dilute color—3½

Solubility:
Alcohols, Ketones, Esters, Chlorinated hydrocarbons, Aromatic hydrocarbons, Mineral oils, Lubricating oils — Soluble The alkalinity is present in the form of calcium hydroxide.

Also useful is Calcium Petronate where the alkalinity is still present but in the form of calcium carbonate. This product is known at "Neutral Calcium Petronate" because its free alkalinity is about 1 mg. whereas Basic Calcium Petronate has a free alkalinity of about 25 mg. The properties of Neutral Calcium Petronate and Basic Calcium Petronate are otherwise the same.

BASIC BARIUM PETRONATE

Typical analysis:
Base number—70 mg. KOH/g.
Barium sulfonate—44.0% by weight
Barium—14.7% by weight
Water—0.5% by weight
Sodium—0.1% by weight
Molecular weight
as sodium—495
as barium—1081

Typical properties:
Specific gravity at 60° F.—1.12
Weight per gallon at 60° F.—9.33 lbs.
Saybolt viscosity at 210° F.—270
Flash point—380° F.
Fire point—410° F.
ASTM dilute color—4.5

Solubility:
Alcohols, Ketones, Esters, Chlorinated hydrocarbons, Aromatic hydrocarbons, Mineral oils, Lubricating oils — Soluble

PURIFIED PYRONATES

Pyronate 50

| | Percent by weight |
|---|---|
| Sulfonates | 50 |
| Mineral oil | 7 |
| Inorganic salts | 4 |
| Water | 39 |
| Total | 100 |
| Color | Dark |
| Molecular weight | 350/370 |
| Weight per gallon, lbs. | 10.0 |

Pyronate 30

| | Percent by weight |
|---|---|
| Sulfonates | 30 |
| Mineral oil | 10 |
| Inorganic salts | 10 |
| Water | 50 |
| Total | 100 |
| Color | Dark |
| Molecular weight | 350/370 |
| Weight per gallon, lbs. | 9.6 |

Solubility:
Pyronate 30 and Pyronate 50 are soluble only in water.

PETROSUL 742

Typical analysis:
Sulfonate type—sodium
Molecular weight ($NaRSO_3$)—415/430
Sulfonates (min.)—62% by weight
Mineral oil (max.)—35% by weight
Inorganic salt (max.)—0.4% by weight
Water (max.)—5% by weight
Free alkalinity, $Na_2O$—0.3% by weight Typical properties:
Color*, ASTM-D-1500—3
Weight per gallon at 60° F.—8.4 lbs.

PETROSUL 745

Typical analysis:
Sulfonate type—sodium
Molecular weight ($NaRSO_3$)—460/475
Sulfonates (min.)—62% by weight
Mineral oil (max.)—35% by weight
Inorganic salt (max.)—0.4% by weight
Water (max.)—5% by weight
Free alkalinity, $Na_2O$—0.3% by weight Typical properties
Color*, ASTM-D-1500—3
Weight per gallon at 60° F.—8.6 lbs.

*Determined on 6% solution of 100% sulfonate in 30+ Saybolt white mineral oil.

PETROSUL 545

Typical analysis:
Sulfonate type—sodium
Molecular weight ($NaRSO_3$)—460/475
Sulfonates (min.)—50% by weight
Mineral oil (max.)—47% by weight
Inorganic salt (max.)—0.3% by weight
Water (max.)—4% by weight
Free alkalinity, $Na_2O$—0.25% by weight PETROSUL 545—Continued Typical properties:
- Color*, ASTM-D-1500—3
- Weight per gallon at 60° F.—8.3 lbs.

PETROSUL 750

Typical analysis:
- Sulfonate type—sodium
- Molecular weight ($NaRSO_3$)—505/520
- Sulfonates (min.)—62% by weight
- Mineral oil (max.)—35% by weight
- Inorganic salt (max.)—0.4% by weight
- Water (max.)—5% by weight
- Free alkalinity, $Na_2O$—0.3% by weight Typical properties
- Color*, ASTM-D-1500—3
- Weight per gallon at 60° F.—8.6 lbs.

*Determined on 6% solution of 100% sulfonate in 30+ Saybolt white mineral oil.

PETROSUL 550

Typical analysis:
- Sulfonate type—sodium
- Molecular weight ($NaRSO_3$)—505/520
- Sulfonates (min.)—50% by weight
- Mineral oil (max.)—47% by weight
- Inorganic salt (max.)—0.3% by weight
- Water (max.)—4% by weight
- Free alkalinity, $Na_2O$—0.25% by weight Typical properties:
- Color*, ASTM-D-1500—3
- Weight per gallon at 60° F.—8.3 lbs.

PETROSUL 744LC

Typical analysis:
- Sulfonate type—sodium
- Molecular weight ($NaRSO_3$)—440/450
- Sulfonates (min.)—62% by weight
- Mineral oil (max.)—35% by weight
- Inorganic salt (max.)—0.4% by weight
- Water (max.)—5% by weight
- Free alkalinity, $Na_2O$—0.3% by weight Typical properties:
- Color*, ASTM-D-1500—5
- Weight per gallon at 60° F.—8.6 lbs.

*Determined on 6% solution of 100% sulfonate in 30+ Saybolt white mineral oil.

NEUTRAL CALCIUM PETROSUL

Typical analysis:
- Sulfonate type—calcium
- Molecular weight ($NaRSO_3$)—1000/1040
- Sulfonates (min.)—40% by weight
- Mineral oil (max.)—58% by weight
- Inorganic salt (max.)—0.5% by weight
- Water (max.)—3% by weight
- Free alkalinity, $Na_2O$—0.2% by weight Typical properties:
- Color*, ASTM-D-1500—5
- Weight per gallon at 60° F.—8.0 lbs.
- Weight per gallon at 60° F.—8.0 lbs.

NEUTRAL BARIUM PETROSUL

Typical analysis:
- Sulfonate type—barium
- Molecular weight ($NaRSO_3$)—1100/1140
- Sulfonates (min.)—40% by weight
- Mineral oil (max.)—58% by weight
- Inorganic salt (max.)—0.5% by weight
- Water (max.)—3% by weight
- Free alkalinity, $Na_2O$—0.2% by weight Typical properties
- Color*, ASTM-D-1500—5
- Weight per gallon at 60° F.—8.2 lbs.

*Determined on 6% solution of 100% sulfonate in 30+ Saybolt white mineral oil.

The petroleum sulfonates provide good results on direct printing plates, either flat or curved, when present in amounts ranging from about 0% to about 10% by weight of the filming agent, the preferred range being from about 0% to about 6% by weight of the filming agent. The petroleum sulfonates provide good results on deep etched plates whether for hot stamping, embossing or for the preparation of box dies, i.e., by molding, when present in amounts ranging from about 2% to about 15% by weight of the filming agent, the preferred range being from about 4% to about 10% by weight of the filming agent.

Other types of sulfonated anionic surfactants can be employed if desired such, for instance, as alkyl naphthalene sulfonic acids where the alkyl group is a branched or unbranched aliphatic group of 4 to 18 carbon atoms in the carbon chain such as nonyl naphthalene sulfonic acid or dodecyl naphthalene sulfonic acid, mono- or di-alkyl benzene sulfonic acids where the alkyl groups may be branched or unbranched from 4 to 18 carbon atoms for the carbon chain, such as dodecyl benzene sulfonic acid, hexadecyl benzene sulfonic acid and didodecyl benzene sulfonic acid, and sulfonated oleic and ricinoleic acids and their esters.

These other anionic sulfonated surfactants provide good results on direct printing plates, either flat or curved, when present in amounts ranging from about 0% to about 6% by weight of the filming agent, the preferred range being from about 1% to about 5% by weight of the filming agent. They give good results on deep etched plates and plates for hot stamping, embossing and box dies, e.g., by molding, when present in amounts ranging from about 0% to about 6% by weight of the filming agent, the preferred range being from about 0% to about 4% by weight of the filming agent.

The third optional additive to the filming agent is an alkyl quaternary fatty amine or salt thereof.

The alkyl quaternary fatty amine has the formula

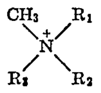

where $R_1$ is a member selected from the group consisting of an alkyl having from 8 to 18 carbon atoms in the carbon chain, which preferably are unbranched, and which usually are a mixture of saturated and unsaturated alkyl groups as is common in naturally occurring products, $R_2$ is a member selected from the group consisting of $CH_3$, cyclic and alkyl groups having from 8 to 18 carbon atoms in the carbon chain, which preferably are unbranched, and which usually are a mixture of saturated and unsaturated groups as is common in naturally occurring products, and $R_3$ is a member selected from the group consisting of $CH_3$ and having from 8 to 18 carbon atoms in the carbon chain, which preferably are unbranched, and which usually are a mixture of saturated and unsaturated groups as is common in naturally occurring products.

Any suitable salts of said amine can be used, preferably a chloride.

A specific example of such an alkyl quaternary fatty amine is dimethyl alkyl furfuryl quaternary amine, commercially available from Archer, Daniels, Midland Company as Adogen 446.

Other satisfactory materials are dimethyl dihydrogenated tallow quaternary amine, dimethyl dicoco quaternary amine, dimethyl disoya quaternary amine, dimethyl distearyl quaternary amine, trimethyl soya quaternary amine, trimethyl coco quaternary amine, trimethyl palmityl quaternary amine, trimethyl stearyl quaternary amine, trimethyl tallow quaternary amine, trimethyl hydrogenated tallow quaternary amine, dimethyl disoya quaternary amine chloride and trimethyl dodecyl soya quaternary amine chloride.

These quaternary amines provide good results when present in amounts ranging from about 0% to about 10% by weight of the filming agent, the preferred range being from about 0% to about 4% by weight of the filming agent.

The presence of these quaternary amines—which are cationic surfactants—is believed to decrease protective and adhesive properties of the filming agent. It is thought that its major effect parallels that of the phosphated ethoxylated ester.

The fourth optional additive to the filming agent is a glycol ether, the same being a compound selected from the group consisting of alkyl ethers of ethylene glycol, diethylene glycol and triethylene glycol, and 1-butoxyethoxy-2-propanol.

The alkyl ethers of ethylene glycol are marketed under the name of Cellosolves. These include, for example, methyl, ethyl, butyl, isobutyl and hexyl ethers of ethylene glycol.

The alkyl ethers of diethylene glycol are marketed under the name of Carbitols. These include, for example, methyl, ethyl, butyl and hexyl carbitols.

The alkyl ethers of triethylene glycol include, for example, methoxy, ethoxy and butoxy triglycols.

A glycol ether provides good results when present in amounts ranging from about 0% to about 50% by weight of the filming agent, the preferred range being from about 8% to about 10% by weight of the filming agent.

The presence of the glycol ether aids in smoothing both the bottom of the etched portions and the shoulders.

The fifth optional additive to the filming agent is a fatty carboxylic acid of the formula

RCOOH where R is an alkyl or alkylene group having from 8 to 18 carbon atoms in the group of the straight or branched chain type. Examples of such acids are: myristic acid, palmitic acid, oleic acid, undecenylic acid, 2-ethyl hexonic acid, isostearic acid, ricinoleic acid and caprylic acid.

These fatty carboxylic acids provide good results when present in amounts ranging from about 0% to about 10% by weight of the filming agent. A preferred range is from about 0% to about 6% by weight of the filming agent.

Preferably no such acid is used when etching direct printing plates, either flat or curved. These acids preferably are employed when etching a certain kind of plate, specifically a plate with a deep narrow etch.

To summarize, the filming agent includes certain preferable ingredients and certain optional ingredients. The preferable ingredients are, by way of recapitulation, a petroleum fraction, a phosphorylated ethoxylated aliphatic alcohol or alkyl phenol, and an ethoxylated amine. The optional additives of the filming agent are a fatty amine, a sulfonated anionic surfactant, an alkyl quaternary fatty amine or salt thereof, a glycol ether and a fatty carboxylic acid.

The filming agent is added to an etchant which likewise is composed of various ingredients. The base ingredient, as noted heretofore, is an aqueous solution of ferric chloride, the parameters of which have been set forth above.

The next necessary ingredient of the etchant is free hydrochloric acid. This can be employed in a range of from about 0.2% to about 12.5% of ferric chloride considered on an anhydrous basis, the hydrochloric acid being considered as concentrated.

The free hydrochloric acid is present to prevent the hydrolysis of the ferric chloride. The hydrolysis of the ferric chloride converts the etchant to a less effective form.

Another ingredient of the etchant, the presence of which is particularly desirable where speedy etching is to be effected, is sulfuric acid.

The place of sulfuric acid in a reaction mechanism for etching aluminum is set forth below in Equation VII. It should be emphasized, however, that sulfuric acid is not necessary as an additional ingredient for etching aluminum. A reaction mechanism for dissolving aluminum by ferric chloride in the absence of sulfuric acid, as shown in Equation I, exists. Without the sulfuric acid the rate of etching is approximately 1 mil per minute at 25° C. By adding other rate-of-etch accelerating agents, which will be discussed hereinafter, this rate of etch can be increased to somewhat short of 2 mils per minute at the same temperature. By way of contrast, when sulfuric acid is present without the other etch accelerating agents at a temperature of 30° C., the etch rate is almost 2 mils per minute, and when sulfuric acid is employed along with the other rate-of-etch accelerating agents the etch rate is in excess of 3 mils per minute.

A peculiar phenomenon has been observed in connection with the addition of sulfuric acid. Despite the fact that sulfuric acid is not an etchant and only plays a part in a reaction mechanism and that, seemingly, the addition of increased amounts of sulfuric acid should not increase the rate of etch due to the fact that sulfuric acid is not an etching agent in the system, just the contrary occurs; that is, addition of more and more sulfuric acid up to a limit has been found to increase the rate of etch to as much as 6 mils per minute in the presence of the other rate-of-etch accelerating agents. When a higher etching temperature is used such, for example, as 30° C., it might be thought that the rate of etch increases with increase in temperature, but this is not true. If the amount of sulfuric acid is held constant at a low percentage such as would give an increased etching speed at a temperature of, for instance, 25° C., an increase in bath temperature is not accompanied by a substantial increase in etch speed.

The sulfuric acid can range from about 0% to about 25% (conc.) by weight of the bath, the preferred amount being from about 0% to about 15% (conc.) by weight of the bath.

The etchant also necessarily, and most importantly, includes two cooperatively functioning specific rate-of-etch accelerating agents. One of these is a cupric salt soluble in the etchant, and the other of these is a thiocyanate salt which is also soluble in the etchant. The purpose of the cupric salt is to incorporate a cupric ion in the etchant. Any water soluble cupric salt is useful such, for instance, as cupric chloride—this being the preferred salt—cupric sulfate, cupric nitrate, cupric iodide, cupric fluoride, cupric acetate and cupric carbonate. Indeed, the ethant is so acidi that it is within the scope of the invention simply to introduce the cupric ion in the form of copper itself which then proceeds to convert to cupric chloride, in which event additional hydrochloric acid is employed.

One of the functions of the cupric ions is to specifically accelerate the rate of dissolution of aluminum by virtue of a reaction which is included among the reaction mechanisms set forth hereinafter, specifically Equation II.

The amount of the cupric ions usable in accordance with the present invention ranges from about 0.1 to about 70 grams per liter of the etching bath, with the preferred range being from about 1 to about 20 grams per liter.

However, when cupric ions are present in the etching bath they convert to cuprous ions and then to copper which tends to plate out on the metal substrate pursuant to subsequent reaction Equation (III); this would decelerate the etch rate. Therefore, further pursuant to the present invention, the etchant includes an anion to convert the cuprous cation to a salt and thus prevent copper plating. The anion employed is thiocyanate because, as has been mentioned earlier, cuprous thiocyanate performs a function additional to that of simply tying up the cuprous ion resulting from dissolving of aluminum pursuant to reaction Equation II. Cuprous thiocyanate is formed at the metal substrate, i.e., in situ, where, because of its physical characteristics, specifically its viscosity and water insolubility, it becomes part of the filming agent to act as an auxiliary banking agent to protect the shoulders of the imaged areas of the metal substrate.

Thus, as will be appreciated from the foregoing, the cupric ions accelerate the rate-of-etch, the thiocyanate ions prevent the rate-of-etch from being slowed down, and the cuprous thiocyanate that is formed by interaction of these two ions functions as an auxiliary banking agent. This auxiliary banking agent is particularly useful with the higher rates of etch obtained by use of the present invention and that are attributable to the presence of sulfuric acid and cupric and thiocyanate ions. At such higher rates of etching the tendency to undercut, reduce low etch factor, increase color loss and leave uneven and dirty surfaces increases, but has been found to be overcome in the presence of the aforesaid auxiliary banking agent. The banking agent is believed to be particularly effective in combination with the accelerated etch rate not only by virtue of its insolubility but further by virtue of its tenacity which is thought to derive from its gelatinous nature. Hence, the cupric ions and thiocyanate ions serve dual functions, the first being as part of the etchant and the second being, when interacted at the surface of the aluminum substrate, as part of the filming agent.

Any water soluble thiocyanate salt is useful such, for instance, as ammonium thiocyanate, sodium thiocyanate, potassium thiocyanate and lithium thiocyanate.

The amount of thiocyanate ions usable in accordance with the invention ranges from about 0.001 to about 2.5 grams per liter of the etching bath, with the preferred range being about 0.01 to about 0.5 gram per liter of the etching bath.

The following reaction mechanisms are believed to control the etching of an aluminum substrate in an etchant of the type above described.

The basic etching action resides in the conversion of aluminum metal to a trivalent state by the action of ferric ions according to the following equation:

$$Al+3Fe^{+++}\rightarrow Al^{+++}+3Fe^{++} \quad (I)$$

This reaction proceeds at a relatively slow rate.

To speed up the action, cupric ions are added. The presence of the cupric ions, per se, accelerates the dissolution of aluminum by speeding up the transfer of electrons from aluminum metal to an acceptor, e.g. the ferric ions, according to the following equation:

$$Al+3Cu^{++}+6Cl^{-}\rightarrow Al^{+++}+3Cu^{+}+6Cl^{-} \quad (II)$$

As reaction (II) proceeds a further reduction of the cuprous ions to a zero valance (metallic) state may take place as follows:

$$Al+3Cu^{+}+3Cl^{-}\rightarrow Al^{+++}+3Cu^{\circ}\downarrow+3Cl^{-} \quad (III)$$

Reaction (III) is undesirable since the copper could plate out and deposit at the metallic surface where it would slow the rate of etching. Cuprous ions together with thiocyanate ions in the etchant form cuprous thiocyanate at the metallic surface which inhibits reaction (III) according to the following equation:

$$Cu^{+}+SCN^{-}\rightarrow CuSCN \quad (IV)$$

The cuprous ions in reaction (IV) are obtained from reaction (II) being tightly bound by the thiocyanate to prevent their reduction to the metallic state.

The cuprous thiocyanate formed in situ at the metallic surface is gelatinous and thereby contributes to the lateral protective effect of the banking agent.

In the reaction mechanism the cupric ions must be regenerated for the etching to proceed at high speed and this is done according to the following equation:

$$Cu^{+}+Fe^{+++}+\rightarrow Cu^{++}+Fe^{++} \quad (V)$$

To summarize, the combination of reactions (II) and (V) is many times faster than reaction (I). The cupric/cuprous system constitutes an electron shuttling mechanism between the aluminum and the ferric ion in a manner analogous to that of a catalyst.

As noted previously, sulfuric acid does not etch aluminum. Yet its presence increases the etch rate to a point where the etching of aluminum is commercially competitive with that of other metal substrates. The function of the sulfuric acid in the reaction mechanism probably is in accordance with the equations set forth below.

It is well known that aluminum ions tend to ionize in aqueous medium to form hydrated aluminum oxide as per the following equation:

$$Al^{+++}+3H_2O\rightleftarrows Al(OH)_3+3H^{+} \quad (VI)$$

The intermediary $Al(OH)_3$ from reaction (VI) irreversibly dehydrates to a form of aluminum oxide. An examination of the reversible reaction of Equation VI indicates that in the presence of hydrogen ions the aluminum hydroxide will be converted back to soluble aluminum ions. The presence of insoluble aluminum oxide slows up and may even stop the etching process, particularly since it forms on the metal substrate. This is prevented by the presence of the sulfuric acid which causes the following reaction:

$$2Al(OH)_3+6H^{+}+3SO_4^{--}\rightarrow 2Al^{+++}+6H_2O+3SO_4^{--} \quad (VII)$$

Mention should be made of the fact that when conversion of the ferric ion to the ferrous state is completed the bath is fully depleted but is restored by the addition of fresh ferric chloride.

The ratio between the amounts of filming agent and etchant employed in the etching bath is capable of wide variation within the ambit of the present invention. It has been ascertained that good results are secured where the filming agent is from about 1% to about 14% by volume of the etching bath, the remainder being the etchant, the preferred range for the filming agent being from about 2% to about 5% by volume of the etching bath.

It is pertinent to observe that when etching on aluminum with previous filming agents used in the etching of other metals, unreliable results are secured. Sometimes no etching takes place. Other times etching takes place but the finished etched article has etched areas which are dirty, i.e., include unetched portions, even where there is no resist. Other times the etching proceeds in such an active manner that it undercuts the shoulders of the imaged areas or that it produces a low etch factor and high color loss. It is believed that this unreliability is due in part to the inability of previous filming agents to secure a good differential etching and in part due to the fact that the surface of an aluminum substrate to be etched various in composition and crystalline structure from point to point and from alloy to alloy. This deficiency is largely overcome by the use of the new filming agent including the new auxiliary banking agent described above.

The filming agent, exclusive of the cuprous thiocyanate which is formed in situ and which filming agent includes the petroleum fraction and the various additives described in detail above, may be stored for protracted periods of time since there is no marked tendency for any of the additives to settle in the water immiscible organic liquid. However, should there, with some particular additives, be noted a tendency to settle after a long standing period, the additives can be readily redispersed by stirring or agitating the filming agent.

To make an etching bath, a major proportion of an etchant, including the ingredients above mentioned, is mixed with a far lesser amount of the aforesaid filming agent. The cupric salt and the thiocyanate salt are part of the said etchant, as are the hydrochloric and sulfuric acids.

When preparing the etchant it should be understood that the ferric chloride solution initially can be introduced in the form of a high Baumé concentration and that sufficient water thereafter can be introduced into the etching bath to obtain the desired degree of concentration of the ferric chloride.

The following are examples of various compositions for carrying out the instant invention:

EXAMPLE I

This example is particularly well suited for the deep etching of an aluminum alloy plate without the necessity of using hand or machine engraving or tooling. It can be used to etch depths of as much as 0.140". It is a type of etching that is suited to the formation of rubber plates by molding because it produces a clean, deep etch with steep non-undercut shoulders.

To a 100-liter etching machine there is added the following etchant and filming agent:

Etchant

| Ingredient: | Quantity |
|---|---|
| (1) Water, q.s.* ---------liters-- | 100 |
| (2) Aqueous solution of ferric chloride (sp. gr. 1.495) ---------liters-- | 40.0 |
| (3) Sulfuric acid (sp. gr. 1.835) ----do---- | 4.0 |
| (5) Cupric chloride (2 waters of hydration grams-- | 500.0 |
| (6) Sodium thiocyanate ---------do---- | 5.0 |
| (14) Concentrated hydrochloric acid -liters-- | 0.8 |

*The numerals in parentheses refer to the different ingredients of the etching bath as characterized and identified in the "Brief Description of the Invention."

The foregoing constitutes 97.0% by volume of the etching bath.

The following filming agent added to the etchant constitutes 3.0% by volume of the etching bath:

Filming agent

| Ingredient: | Percent by weight of filming agent |
|---|---|
| (4) Amsco-Solv. H–J | 46.8 |
| (4) Amsco-Solv. E–98 | 33.1 |
| (7) Wayfos M60 | 6.1 |
| (8) Tallow polyethoxylated amine, $x+y=5$ | 2.3 |
| (10) Petrosul 750 | 2.4 |
| (10) Petronate HL | 2.4 |
| (11) Trimethyldodecyl quaternary aminechloride | 1.5 |
| (13) 1-butoxyethoxy-2-propanol | 5.4 |

A No. 3003 aluminum alloy plate 18" x 8" x ¼" was etched to a depth of 0.140" in 50 minutes in a paddle etchine machine such as the Master M32 having a capacity of 26 gallons with paddles 8" long at a bath temperature of 30° C. and with a paddle speed of 420 r.p.m. The etch rate was approximately 3 mils per minute. An etch factor of about 35 was achieved.

EXAMPLE II

This example is well suited for any etching of aluminum alloy plates and is particularly well adapted for deep etching. To a 100-liter etching machine there is added the following etchant and filming agent:

Etchant

| Ingredient: | Quantity |
|---|---|
| (1) Water, q.s. ---------liters-- | 100 |
| (2) Aqueous solution of ferric chloride (sp. gr. 1.495) ---------liters-- | 49 |
| (3) Sulfuric acid (sp. gr. 1.835) ----do---- | 5.0 |
| (5) Cupric nitrate (3 waters of hydration ---------grams-- | 450.0 |
| (6) Sodium thiocyanate ---------do---- | 10.0 |
| (14) Concentrated hydrochloric acid -liters-- | 1.2 |

The foregoing constitutes 97.0% by volume of the etching bath.

The following filming agent added to the etchant constitutes 3.0% by volume of the etching bath:

Filming agent

| Ingredient: | Percent by weight of filming agent |
|---|---|
| (4) Asco-Solv. H-J | 38.20 |
| (4) Amsco-Solv. H–SB | 38.20 |
| (7) Mayfos M60 | 5.92 |
| (7) Gafac RS 610 | 2.83 |
| (8) Tallow polyethoxylated amine, $x+y=5$ | 6.25 |
| (10) Dipetronate CR | 5.50 |
| (11) Trimethyldodecyl quaternary amine chloride | 1.70 |
| (13) 1-butoxyethoxy-2-propanol | 1.40 |

Typically, this example used as indicated in Example I etched a No. 3003 aluminum alloy plate to a depth of 0.130" in 40 minutes, and No. 6061 aluminum alloy plate to a depth of 0.40" in 14 minutes. The etch factor in both cases was about 70.

EXAMPLE III

Etchant

| Ingredient: | Quantity |
|---|---|
| (1) Water, q.s. ---------liters-- | 100 |
| (2) Aqueous solution of ferric chloride (sp. gr. 1.495) ---------liters-- | 47 |
| (3) Sulfuric acid (sp. gr. 1.835 ------do---- | 7.0 |
| (5) Cupric chloride (2 waters of hydration) grams-- | 550 |
| (6) Sodium thiocyanate ---------do---- | 10 |
| (14) Concentrated hydrochloric acid --liters-- | 1.0 |

The foregoing constitutes 97.0% by volume of the etching bath.

The following filming agent added to the etchant constitutes 3.0% by volume of the etching bath:

Filming agent

| Ingredient: | Percent by weight of filming agent |
|---|---|
| (4) Amsco-Solv. H–J | 31.7 |
| (4) Amsco-Solv. E–98 | 25.0 |
| (4) Amsco 140 Solvent | 19.0 |
| (7) Wayfos M60 | 6.0 |
| (8) Tallow polyethoxylated amine, $x+y=6$ | 4.0 |
| (8) Ethoduomeen T20 | 2.0 |
| (10) Petronate CR | 7.2 |
| (12) Caprylic acid | 5.1 |

This example is good for any type of etching of aluminum alloy plates. It secures a lateral etch factor of approximately 70, has a very low color loss and has an etch rate in the neighborhood of 3 mils per minute employing the machine and parameters described in Example I.

EXAMPLE IV

Etchant

| Ingredient: | Quantity |
|---|---|
| (1) Water, q.s. ---------liters-- | 100 |
| (2) Aqueous solution of ferric chloride (sp. gr. 1.495) ---------liters-- | 43.0 |
| (3) Sulfuric acid (sp. gr. 1.835) -----do---- | 4.0 |
| (5) Cupric chloride (2 waters of hydration) ---------grams-- | 500.0 |
| (6) Sodium thiocyanate ---------do---- | 15 |
| (14) Concentrated hydrochloric acid--liters-- | 0.5 |

The foregoing constitutes 97.5% by volume of the etching bath.

The following filming agent added to the etchant constitutes 2.5% by volume of the ettching bath.

Filming agent

| Ingredient: | Percent by weight of filming agent |
|---|---|
| (4) Amsco-Solv. H–J | 55.60 |
| (4) Amsco-Solv. G | 27.60 |
| (7) Wayfos M60 | 5.50 |
| (8) Tallow polyethoxylated amine, $x+y=5$ | 1.70 |
| (10) Petronate CR | 5.50 |
| (11) Trimethyldodecyl quaternary amine | 2.00 |
| (13) 1-butoxyethoxy-2-propanol | 2.10 |

This example is good for any type of etching of aluminum alloy plates. It secures a lateral etch factor of approximately 70, has a very low color loss and an etch rate in the neighborhood of 3 mils per minute employing the same machine and parameters as described in Example I.

EXAMPLE V

Etchant

| Ingredient: | Quantity |
|---|---|
| (1) Water, q.s. ____liters | 100 |
| (2) Aqueous solution of ferric chloride (sp. gr. 1.495) | 47.0 |
| (3) Sulfuric acid (sp. gr. 1.835) ____liters | 3.0 |
| (5) Cupric chloride (2 waters of hydration) grams | 680 |
| (6) Ammonium thiocyanate ____do | 35 |
| (14) Concentrated hydrochloric acid ____liters | 0.4 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–SB | 60.9 |
| (4) Amsco-Solv. H–CC | 22.8 |
| (7) Gafac RS610 | 6.1 |
| (8) Tallow polyethoxylated amine, $x+y=7$ | 2.0 |
| (9) Armeen 8D | 0.5 |
| (10) Petronate HL | 4.8 |
| (11) Trimethyldodecyl quaternary amine chloride | 1.5 |
| (13) Butyl Cellosolve | 1.4 |

This example is particularly well suited for etching shallow relief aluminum alloy plates to a depth of about 0.040″ with the same machine and parameters as described in Example I. The rate of etch is about 3 mils per minute and the etch factor is about 80.

EXAMPLE VI

Etchant

| Ingredient: | Quantity |
|---|---|
| (1) Water, q.s. ____liters | 100 |
| (2) Aqueous solution of ferric chloride (sp. gr. 1.495) ____liters | 42.0 |
| (3) Sulphuric acid (sp. gr. 1.835) ____do | 4.0 |
| (5) Cupric nitrate (3 waters of hydration) grams | 2000 |
| (6) Potassium thiocyanate ____do | 20 |
| (14) Concentrated hydrochloric acid liters | 0.9 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–SB | 47.0 |
| (4) Diethyl benzene | 35.9 |
| (7) Gafac RE610 | 5.5 |
| (8) Tallow polyethoxylated amine, $x+y=5$ | 2.0 |
| (10) Petronate L | 3.3 |
| (10) Petrosul 750 | 2.2 |
| (10) Dipetronate H–L | 1.3 |
| (13) Butyl Cellosolve | 2.8 |

This example when used as per Example I etches at the rate of about 4.5 mils per minute and has an etch factor of about 80.

EXAMPLE VII

Etchant

| Ingredient: | Quantity |
|---|---|
| (1) Water, q.s. ____liters | 100 |
| (2) Aqueous solution of ferric chloride (sp. gr. 1.495) ____liters | 42.0 |
| (3) Sulfuric acid (sp. gr. 1.835) ____do | 4.0 |
| (5) Cupric chloride (2 waters of hydration) grams | 1150 |
| (6) Ammonium thiocyanate ____do | 20 |
| (14) Concentrated hydrochloric acid ____liters | 1.0 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–J | 43.6 |
| (4) Amsco-Solv. G | 34.0 |
| (7) Alkapent TD 60 | 6.2 |
| (8) Ethoduomeen T20 | 1.1 |
| (8) Tallow polyethoxylated amino, $x+y=5$ | 5.4 |
| (10) Petrosul 744LC | 4.3 |
| (10) Petronate K | 0.9 |
| (10) Dipetronate CR | 0.9 |
| (11) Trimethyl soya quaternary amine chloride | 1.8 |
| (13) Butyl Cellosolve | 1.8 |

This example when used as per Example I etches at the rate of about 4 mils per minute and has an etch factor of about 110.

EXAMPLE VIII

Etchant

| Ingredient: | Quantity |
|---|---|
| (1) Water, q.s. ____liters | 100 |
| (2) Aqueous solution of ferric chloride (sp. gr. 1.495) ____liters | 51.0 |
| (3) Sulfuric acid (sp. gr. 1.835) ____do | 5.0 |
| (5) Cupric sulfate ____grams | 450 |
| (6) Potassium thiocyanate ____do | 5 |
| (14) Concentrated hydrochloric acid ____liters | 1.5 |

The foregoing filming agent added to the etchant constitutes 2.5% by volume of the etching bath:

The following filming agent added to the etchant constitutes 2.5% by volume of the etching bath:

Filming agent

| Ingredient: | Percent by weight of filming agent |
|---|---|
| (4) Amsco Hi-Flash Naphtha | 38.8 |
| (4) Amsco-Solv. HB | 40.1 |
| (7) Wayfos M60 | 3.8 |
| (7) Gafac RE610 | 4.2 |
| (8) Tallow polyethoxylated amine, $x+y=10$ | 5.7 |
| (10) Dipetronate CR | 3.5 |

| Ingredient: | Percent by weight of filming agent |
|---|---|
| (11) Dimethyl dicoco quaternary amine chloride | 1.9 |
| (13) Butyl Cellosolve | 2.0 |

This example when used as per Example I etches at the rate of about 3 mils per minute and has an etch factor of about 85.

EXAMPLE IX

Etchant

| Ingredient: | | Quantity |
|---|---|---|
| (1) Water, q.s. | liters | 100 |
| (2) Aqueous solution of ferric chloride (sp. gr. 1.495) | liters | 45.50 |
| (3) Sulfuric acid (sp. gr. 1.835) | do | 6.0 |
| (5) Cupric acetate | grams | 950 |
| (6) Ammonuim thiocyanate | do | 15 |
| (14) Concentrated hydrochloric acid | liters | 0.05 |

The foregoing constitutes 97.5% volume of the etching bath.

The following filming agent added to the etchant constitutes 2.5% by volume of the etching bath:

Filming agent

| Ingredient: | Percent by weight of filming agent |
|---|---|
| (4) Amsco Hi-Flash Naphtha | 29.9 |
| (4) Amsco-Solv. H–J | 30.0 |
| (7) Wayfos M60 | 5.3 |
| (7) Gafac RS610 | 8.0 |
| (8) Tallow polyethoxylated amine, $x+y=5$ | 10.4 |
| (10) Petrosul 550 | 2.2 |
| (10) Petrosul 744LC | 4.4 |
| (10) Neutral Barium Petrosul | 4.0 |
| (11) Octadecenyl trimethyl quaternary amine chloride | 4.0 |
| (13) Butyl Cellosolve | 1.8 |

This example when used as per Example I etches at the rate of about 3 mils per minute and has an etch factor of about 55.

EXAMPLE X

Etchant

| Ingredient: | | Quantity |
|---|---|---|
| (1) Water, q.s. | liters | 100 |
| (2) Aqueous solution of ferric chloride (sp. gr. 1.495) | liters | 45.5 |
| (3) Sulfuric acid (sp. gr. 1.835) | do | 6.0 |
| (5) Cupric iodide | grams | 500 |
| (6) Ammonium thiocyanate | do | 10 |
| (14) Concentrated hydrochloric acid | liters | 1.0 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–J | 51.0 |
| (4) Amsco-Solv. G | 30.5 |
| (7) Wayfos TD 60 | 6.8 |
| (8) Tallow polyethoxylated amine, $x+y=5$ | 4.0 |
| (10) Petronate H | 3.5 |
| (11) Trimethyl dodecyl quaternary amine chloride | 2.0 |
| (13) Butyl Cellosolve | 2.2 |

This example when used as per Example I etches at the rate of about 13 mils per minute and has an etch factor of about 95.

EXAMPLE XI

Etchant

| Ingredient: | | Quantity |
|---|---|---|
| (1) Water, q.s. | liters | 100 |
| (2) Aqueous solution of ferric chloride (sp. gr. 1.495) | liters | 45.5 |
| (3) Sulfuric acid (sp. gr. 1.835) | liters | 45.5 |
| (5) Cupric chloride (2 waters of hydration) | grams | 500 |
| (6) Ammonium thiocyanate | do | 10 |
| (14) Concentrated hydrochloric acid | liters | 1.0 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–J | 51.0 |
| (4) Amsco-Solv. G | 30.5 |
| (7) Wayfos TD 60 | 6.8 |
| (8) Tallow polyethoxylated amine, $x+y=5$ | 4.0 |
| (10) Petronate H | 3.5 |
| (11) Trimethyl dodecyl quaternary amine chloride | 2.0 |
| (13) Butyl Cellosolve | 2.2 |

This example when used as per Example I etches at the rate of about 3 mils per minute and has an etch factor of about 65.

EXAMPLE XII

Etchant

| Ingredient: | | Quantity |
|---|---|---|
| (1) Water, q.s. | liters | 100 |
| (2) Aqueous solution of ferric chloride (sp. gr. 1.495) | liters | 45.0 |
| (3) Sulfuric acid (sp. gr. 1.835) | liters | 7.0 |
| (5) Cupric chloride (2 waters of hydration) | grams | 1000 |
| (6) Ammonium thiocyanate | grams | 15 |
| (14) Concentrated hydrochloric acid | liters | 0.9 |

The foregoing constitutes 97.5% by volume of the etching bath.

The following filming agent added to the etchant constitutes 2.5% by volume of theq etching bath:

Filming agent

| Ingredient: | Percent by weight of filming agent |
|---|---|
| (4) Amsco-Solv. H–J | 51.0 |
| (4) Amsco-Solv. G | 30.5 |
| (7) Wayfos TD 60 | 6.8 |
| (8) Tallow polyethoxylated amine, $x+y=5$ | 4.0 |
| (10) Petronate H | 3.5 |
| (11) Trimethyl dodecyl quaternary amine chloride | 2.0 |
| (13)Butyl Cellosolve | 2.2 |

This example when used as per Example I etches at the rate of about 4 mils per minutes and has an etch factor of about 100.

EXAMPLE XIII

Etchant

| Ingredient: | | Quantity |
|---|---|---|
| (1) Water, q.s. | liters | 100 |
| (2) Aqueous solution of ferric chloride (sp. gr. 1.495) | liters | 53.0 |
| Filming agent | liters | 3.2 |
| (3) Sulfuric acid (sp. gr. 1.835) | liters | 5.0 |
| (5) Cupric chloride (2 water of hydration) | grams | 500 |
| (6) Ammonium thiocyanate | grams | 15 |
| (14) Concentrated hydrochloric acid | liters | 1.2 |

Filming agent

| Ingredient: | Percent weight of filming agent |
|---|---|
| (4) Amsco-Solv. H–J | 48.0 |
| (4) Amsco-Solv. G | 30.0 |
| (7) Wayfos M60 | 7.2 |
| (8) Tallow polyethoxylated amine $x+y=5$ | 5.0 |
| (10) Petrosul 70 | 6.5 |
| (11) Trimethyl dodecyl quaternary amine chloride | 2.0 |
| (13) 1-butoxyethoxy-2-propanol | 1.3 |

This example when used as per Example I at a bath temperature of 80° F. etches at a rate of about 3 mils per minute and has an etch factor of about 100.

EXAMPLE XIV

Etchant

| Ingredient: | | Quantity |
|---|---|---|
| (1) Water, q.s. | liters | 100 |
| (2) Aqueous solution of ferric chloride (sp. gr. 1.495) | liters | 49.0 |
| Filming Agent | liters | 2.7 |
| (3) Sulfuric acid (sp. gr. 1.835) | liters | 6.7 |
| (5) Cupric chloride (2 waters of hydration) | grams | 650 |
| (6) Ammonium thiocyanate | grams | 10 |
| (14) Concentrated hydrochloric acid | liters | 1.0 |

Filming agent

| Ingredient: | Percent by weight of filming agent |
|---|---|
| (4) Amsco-Solv. G. | 60.0 |
| (4) Amsco-Solv. H–J | 20.0 |
| (7) Gafac RE 610 | 7.0 |
| (8) Tallow polyethoxylated amine $x+y=6$ | 4.8 |
| (10) Petronate HL | 6.0 |
| (13) 1-butoxyethoxy-2-propanol | 2.2 |

This example when used as per Example I at a bath temperature of 90° F. etches at a rate of about 5 mils per minute and has an etch factor of about 120.

EXAMPLE XV

Etchant

| Ingredient: | | Quantity |
|---|---|---|
| (1) Water, q.s. | liters | 100 |
| (2) Aqueous solution of ferric chloride (sp. gr. 1.495) | liters | 50.0 |
| Filming Agent | liters | 2.8 |
| (3) Sulfuric acid (sp. gr. 1.835) | liters | 7.2 |
| (5) Cupric chloride (2 waters of hydration) | grams | 500 |
| (6) Ammonium thiocyanate | grams | 10 |
| (14) Concentrated hydrochloric acid | liters | 1.2 |

Filming agent

| Ingredient: | Percent by weight of filming agent |
|---|---|
| (4) Amsco-Solv. H–J | 52.0 |
| (4) Amsco-Solv. G | 25.0 |
| (7) Wayfos M60 | 7.0 |
| (8) Tallow polyethoxylated amine $x+y=5$ | 5.0 |
| (8) Ethoduomeen T/20 | 3.0 |
| (10) Petronate HL | 3.8 |
| (10) Petronate L | 2.0 |
| (13) Butyl Cellosolve | 2.2 |

This example when used as per Example I at a bath temperature of 90° F. etches at a rate of about 5 mils per minute and has an etch factor of about 120.

EXAMPLE XVI

Etchant

| Ingredient: | | Quantity |
|---|---|---|
| (1) Water, q.s. | liters | 100 |
| (2) Aqueous solution of ferric chloride (sp. gr. 1.495) | liters | 48.0 |
| (3) Sulfuric acid (sp. gr. 1.835) | do | 4.0 |
| (5) Cupric chloride (2 waters of hydration) | grams | 600 |
| (6) Ammonium thiocyanate | do | 15 |
| (14) Concentrated hydrochloric acid | liters | 1.0 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. E–98 | 59.0 |
| (4) Amsco 460 Solvent | 21.0 |
| (7) Gafac RL 610 | 4.2 |
| (8) Tallow polyethoxylated amino, $x+y=5$ | 2.0 |
| (10) Petronate K | 1.5 |
| (11) Octadecenyl dimethyl quaternary amine chloride | 2.5 |
| (13) 1-butoxyethoxy-2-propanol | 9.8 |

This example when used as per Example I etches at the rate of about 3 mils per minute and has an etch factor of about 120.

EXAMPLE XVII

Etchant

| Ingredient: | | Quantity |
|---|---|---|
| (1) Water, q.s. | liters | 100 |
| (2) Aqueous solution of ferric chloride (sp. gr. 1.495) | liters | 45.5 |
| (3) Sulfuric acid (sp. gr. 1.835) | do | 5.0 |
| (5) Cupric nitrate (3 waters of hydration) | grams | 1050 |
| (6) Ammonium thiocyanate | do | 15 |
| (14) Concentrated hydrochloric acid | liters | 1.0 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–CC | 10.1 |
| (4) Amsco-Solv. H–J | 24.3 |
| (4) Amsco 140 Solvent | 35.2 |
| (7) Wayfos M60 | 10.1 |
| (8) Tallow polyethoxylated amine $x+y=5$ | 6.9 |
| (8) Ethoduomeen T/25 | 2.6 |
| (10) Petronate CR | 3.5 |
| (11) Octadecenyl trimethyl quaternary amine chloride | 2.1 |
| (13) Butyl Cellosolve | 5.0 |

This example when used as per Example I etches at the rate of about 3 mils per minute and has an etch factor of about 75.

EXAMPLE XVIII

Etchant

| Ingredient: | | Quantity |
|---|---|---|
| (1) Water, q.s. | liters | 100 |
| (2) Aqueous solution of ferric chloride (sp. gr. 1.495) | liters | 42.0 |
| (3) Sulfuric acid (sp. gr. 1.835) | do | 4.0 |
| (5) Cupric Chloride (2 waters of hydration) | grams | 1150 |
| (6) Potassium thiocyanate | do | 10 |
| (14) Concentrated hydrochloric acid | liters | 1.1 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. G | 45.2 |
| (4) Amsco-Solv. H–SB | 42.8 |
| (7) Gafac RE 610 | 3.2 |
| (8) Tallow polyethoxylated amine $x+y=5$ | 3.0 |
| (10) Petronate CR | 1.5 |
| (11) Trimethyl dodecyl quaternary amine chloride | 2.5 |
| (13) 1-butoxyethoxy-2-propanol | 1.8 |

This example when used as per Example I etches at the rate rate of about 3 mils per minute and has an etch factor of about 135.

EXAMPLE XIX

Etchant

| Ingredient: | Quantity |
|---|---|
| (1) Water, q.s. ____liters | 100 |
| (2) Aqueous solution of ferric chloride (sp. gr. 1.495) ____liters | 66.98 |
| (3) Sulfuric acid (sp. gr. 1.835) ____do | 0.8 |
| (5) Cupric nitrate (3 waters of hydration) ____grams | 450 |
| (6) Ammonium thiocyanate ____do | 7.5 |
| (14) Concentrated hydrochloric acid ____liters | 1.4 |

The following constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. H–J | 88.4 |
| (7) Gafac RS 610 | 4.5 |
| (8) Ethoduomeen T/25 | 1.2 |
| (9) Armeen 8D | 1.8 |
| (10) Petronate HL | 2.1 |
| (11) Trimethyl dodecyl quaternary amino chloride | 2.0 |

This example when used as per Example I at a bath temperature of 25° C. etches at the rate of about 1.6 mils per minute and has an etch factor of about 100.

EXAMPLE XX

Etchant

| Ingredient: | Quantity |
|---|---|
| (1) Water, q.s. ____liters | 100 |
| (2) Aqueous solution of ferric chloride (sp. gr. 1.495) ____liters | 55.85 |
| (5) Cupric chloride (2 waters of hydration ____grams | 350 |
| (6) Sodium thiocyanate ____grams | 5 |
| (14) Concentrated hydrochloric acid ____liters | 1.2 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco 460 Solvent | 15.0 |
| (4) Amsco-Solv. G | 68.7 |
| (7) Wayfos M60 | 5.3 |
| (8) Tallow polyethoxylated amine $x+y=5$ | 2.8 |
| (9) Armeen 8D | 3.0 |
| (10) Petronate CR | 2.4 |
| (11) Adogen 446 | 2.8 |

This example when used as per Example I at a bath temperature of 26° C. etches at the rate of about 1.4 mils per minute and has an etch factor of about 100.

EXAMPLE XXI

Etching bath

| Ingredient: | Quantity |
|---|---|
| (1) Water, q.s. ____liters | 100 |
| (2) Aqueous solution of ferric chloride (sp. gr. 1.495) ____liters | 60.00 |
| Filming agent ____do | 2.50 |
| (5) Cupric chloride (2 waters of hydration) ____grams | 500 |
| (6) Ammonium thiocyanate ____do | 8 |
| (4) Concentrated hydrochloric acid ____liters | 1.4 |

Filming agent

| Ingredient: | Percent by weight of filming agent |
|---|---|
| (4) Amsco-Solv. H-J | 44.2 |
| (4) Amsco-Solv. G. | 44.2 |
| (7) Gafac RS 610 | 4.5 |
| (8) Ethoduomeen T/25 | 1.2 |
| (9) Armeen 8D | 1.8 |
| (10) Petronate HL | 2.1 |
| (11) Trimethyldodecyl quaternary amine chloride | 2.0 |

This example when used as per Example I at a bath temperature of 70° F. etches at the rate of about 1.5 mils per minute and has an etch factor of about 80.

If it is desired to accelerate the rate of each of baths such as the foregoing which contain no sulfuric acid in the initial bath, for every 20 oz. of aluminum etched the bath is replenished by adding 0.8 liter of concentrated sulfuric acid and the temperature of the bath raised to 74° F., at which time the etch rate will be elevated to 1.8 mils per minute with an etch factor of about 80. If it is desired to further accelerate the etch rate of such bath, an additional liter of concentrated sulfuric acid is added for each 20 oz. of aluminum etched and the temperature raised to 76° F., the etch rate thereupon being elevated to 2.0 mils per minute. Etch factor remains at about 80.

EXAMPLE XXII

Etching bath

| Ingredient: | Quantity |
|---|---|
| (1) Water, q.s. ____liters | 100 |
| (2) Aqueous solution of ferric chloride (sp. gr. 1.495) ____liters | 60.00 |
| Filming agent ____do | 6.50 |
| (5) Cupric chloride (2 waters of hydration) ____grams | 350 |
| (6) Ammonium thiocyanate ____do | 12 |
| (14) Concentrated hydrochloric acid ____liters | 0.1 |

Filming agent

| Ingredient: | Percent by weight of filming agent |
|---|---|
| (4) Amsco-Solv. G. | 88.50 |
| (7) Wayfos M60 | 3.30 |
| (8) Tallow polyethoxylated amine, $x+y=5$ | 2.70 |
| (9) Armeen 8D | 1.00 |
| (10) Petrosul 750 | 2.50 |
| (11) Trimethyl dodecyl quaternary amine chloride | 2.00 |

This example when used as per Example I at a bath temperature of 70° F. etches at the rate of about 1.5 mils per minute and has an etch factor of about 75.

EXAMPLE XXIII

Etching bath

| Ingredient: | Quantity |
|---|---|
| (1) Water, q.s. ____liters__ | 100 |
| (2) Aqueous solution of ferric chloride (sp. gr. 1.495) ____liters__ | 67.00 |
| Filming agent ____do____ | 2.53 |
| (5) Cupric chloride (2 waters of hydradration) ____grams__ | 600 |
| (6) Ammonium thiocyanate ____do____ | 14 |
| (14) Concentrated hydrochloric acid __liters__ | 0.08 |

Filming agent

| Ingredient: | Percent by weight of filming agent |
|---|---|
| (4) Amsco-Solv. G. | 85.0 |
| (7) Wayfos M60 | 4.2 |
| (8) Tallow polyethoxylated amine, $x+y=5$ | 3.5 |
| (10) Petronate HL | 2.8 |
| (11) Adogen 446 | 2.0 |
| (13) 1-butoxyethoxy-2-propanol | 2.5 |

This example when used as per Example I at a bath temperature of 70° F. etches at the rate of about 1.5 mils per minute and has an etch factor of about 80.

EXAMPLE XXIV

Etching bath

| Ingredient: | Quantity |
|---|---|
| (1) Water, q.s. ____liters__ | 100 |
| (2) Aqueous solution of ferric chloride (sp. gr. 1.495) ____liters__ | 56.00 |
| Filming agent ____do____ | 8.50 |
| (5) Cupric chloride (2 waters of hydration) ____grams__ | 575 |
| (6) Ammonium thiocyanate ____do____ | 10 |
| (14) Concentrated hydrochloric acid __liters__ | 0.2 |

Filming agent

| Ingredient: | Percent by weight of filming agent |
|---|---|
| (4) Amsco-Solv. H-J | 70.0 |
| (4) Amsco-Solv. G | 11.5 |
| (7) Wayfos M60 | 6.8 |
| (8) Tallow polyethoxylated amine, $x+y=5$ | 4.5 |
| (10) Petronate CR | 3.0 |
| (11) Trimethyldodecyl quaternary amine chloride | 2.0 |
| (13) 1-butoxyethoxy-2-propanol | 2.2 |

This example when used as per Example I at a bath temperature of 70° F. etches at the rate of about 1.5 mils per minute and has an etch factor of about 100.

EXAMPLE XXV

Etching bath

| Ingredient: | Quantity |
|---|---|
| (1) Water, q.s. ____liters__ | 100 |
| (2) Aqueous solution of ferric chloride (sp. gr. 1.495) ____liters__ | 57.00 |
| Filming agent ____do____ | 13.60 |
| (5) Cupric chloride (2 waters of hydration) ____grams__ | 900 |
| (6) Ammonium thiocyanate ____do____ | 15 |
| (14) Concentrated hydrochloric acid __liters__ | 0.1 |

Filming agent

| Ingredient: | Percent by weight of filming agent |
|---|---|
| (4) Amsco 460 Solvent | 85.0 |
| (7) Wayfos M60 | 5.3 |
| (8) Tallow polyethoxylated amine, $x+y=5$ | 2.8 |
| (9) Armeen 8D | 3.0 |
| (10) Petronate CR | 2.4 |
| (11) Adogen 446 | 1.5 |

This example when used as per Example I at a bath temperature of 70° F. etches at the rate of about 1.5 mils per minute and has an etch factor of about 70.

EXAMPLE XXVI

Etching bath

| Ingredient: | Quantity |
|---|---|
| (1) Water, q.s. ____liters__ | 100 |
| (2) Aqueous solution of ferric chloride (sp. gr. 1.495) ____liters__ | 67.00 |
| Filming agent ____do____ | 1.47 |
| (5) Cupric chloride (2 waters of hydration) ____grams__ | 800 |
| (6) Ammonium thiocyanate ____do____ | 12 |
| (14) Concentrated hydrochloric acid __liters__ | 0.2 |

Filming agent

| Ingredient: | Percent by weight of filming agent |
|---|---|
| (4) Amsco-Solv. E-98 | 82.5 |
| (4) Amsco-Solv. H-J | 7.0 |
| (7) Wayfos M60 | 4.1 |
| (8) Tallow polyethoxylated amine, $x+y=5$ | 2.0 |
| (10) Petronate CR | 2.1 |
| (11) Trimethyl dodecyl quaternary amine chloride | 1.3 |
| (13) 1-butoxyethoxy-2-propanol | 1.0 |

This example when used as per Example I at a bath temperature of 70° F. etches at the rate of about 1.5 mils per minute and has an etch factor of about 90.

EXAMPLE XXVII

Etchant

| Ingredient: | Quantity |
|---|---|
| (1) Water,q.s. ____liters__ | 100 |
| (2) Aqueous solution of ferric chloride (sp. gr. 1.495) ____liters__ | 42.0 |
| Sulfuric acid (sp. gr. 1.835) ____do____ | 4.0 |
| (5) Cupric chloride (2 waters of hydration) ____grams__ | 1150 |
| (6) Potassium thiocyanate ____do____ | 10 |
| (14) Concentrated hydrochloric acid __liters__ | 1.1 |

The foregoing constitutes 97.5% by volume of the etching bath.

The following filming agent added to the etchant constitutes 2.5% by volume of the etching bath:

Filming agent

| Ingredient: | Percent by weight of filming agent |
|---|---|
| (4) Amsco-Solv. G | 85.0 |
| (7) Wayfos M60 | 4.2 |
| (8) Tallow polyethoxylated amine, $x+y=5$ | 3.5 |
| (10) Petronate HL | 2.0 |
| (10) Sulfonated castor oil | 1.4 |
| (12) Caprylic acid | 0.6 |
| (13) 1-butoxyethoxy-2-propanol | 2.5 |

This example when used as per Example I etches at the rate of about 3 mils per minute and has an etch factor of about 135.

It thus will be seen that there are provided an etchant and method which achieve the various objects of the invention and which are well adapted to meet the conditions of practical use.

As various possible embodiments might be made of the above invention, and as various changes might be made in the embodiments above set forth, it is to be understood that all matter herein described or shown is to be interpreted as illustrative and not in a limiting sense.

Having thus described the invention there is claimed as new and desired to be secured by Letters Patent:

1. An etching liquid for etching a patterned-resist-protected surface of an oxidizable metal object by directing such liquid onto such surface substantially perpendicularly thereto, said etching liquid being composed of a two-phase dispersion constituting an etchant and a filming agent, said etchant including water, ferric chloride, a water soluble cupric salt, a water soluble thiocyanate salt and free hydrochloric acid, said filming agent including a liquid water immiscible hydrocarbon fraction and surfactants.

2. An etching liquid as set forth in claim 1 wherein the filming agent is present in an amount of from about 1% to about 14% by volume of the etching liquid, the remainder of the liquid constituting the etchant.

3. An etching liquid as set forth in claim 2 wherein the ferric chloride is present in an amount from 150 grams, anhydrous, per liter of etching liquid to the solubility limit thereof.

4. An etching liquid as set forth in claim 3 wherein the free hydrochloric acid is present in an amount of from about 0.2% to about 12.5% by weight of the ferric chloride, the hydrochloric acid being considered on a concentrated basis and the ferric chloride being considered on an anhydrous basis.

5. An etching liquid as set forth in claim 4 wherein the hydrocarbon fraction constitutes from about 40% to about 85% by volume of the filming agent.

6. An etching liquid as set forth in claim 5 wherein the cupric salt contains as copper from about 0.1 to about 70 grams per liter of the etching liquid and the thiocyanate salt contains as thiocyanate from about 0.001 to about 2.5 grams per liter of the etching liquid.

7. An etching liquid as set forth in claim 6 wherein the hydrocarbon fraction is principally aromatic.

8. An etching liquid as set forth in claim 6 wherein the hydrocarbon fraction includes up to 100% of an aliphatic petroleum fraction, the balance being aromatic.

9. An etching liquid as set forth in claim 6 wherein the etchant includes sulfuric acid.

10. An etching liquid as set forth in claim 6 wherein the etchant includes sulfuric acid up to about 25% by volume of the etchant on a concentrated sulfuric acid basis.

11. An etching liquid as set forth in claim 10 wherein the filming agent includes a phosphorylated ethoxylated ester and an ethoxylated amine.

12. An etching liquid as set forth in claim 11 wherein the phosphorylated ethoxylated ester is present in an amount of from about 3% to about 25% by weight of the filming agent and is an ester of orthophosphoric acid and a compound selected from the group consisting of ethoxylated aliphatic alcohols and ethoxylated alkyl phenols, being a mixture of mono- and di-phosphate esters having the formula

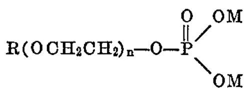

for the mono-phosphate ester, and the formula

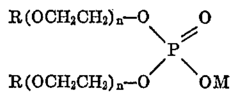

for the di-phosphate ester, where R is a member selected from the group consisting of alkyl phenol residues and aliphatic alcohol residues in which the non-aromatic portions thereof have from 8 to 24 carbon atoms, preferably are saturated, and are branched and unbranched, M is H, Na, K or $NH_3$, and $n$ is an integer from 1 to 20, the ethoxylation being between 40% and 90%, and wherein the ethoxylated amine is present in an amount of from about 1% to about 20% by weight of the filming agent and is a polyethoxylated mono- or di-amine having the formula

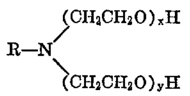

for the polyethoxylated monoamine, where $x+y$ is an integer ranging from 2 to 50 and where R is an alkyl group having from 8 to 18 carbon atoms in the carbon chain, and the formula

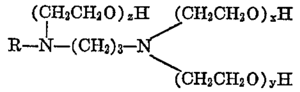

for the polyethoxylated diamine, where $x+y+z$ is an integer ranging from 3 to 80, R being an alkyl group having from 8 to 18 carbon atoms in the carbon chain.

13. An etching liquid as set forth in claim 11 wherein the filming agent further includes a fatty amine.

14. An etching liquid as set forth in claim 11 wherein the filming agent further includes up to about 3% by weight on the basis of the filming agent of a fatty amine having the formula

where $R_1$ is a member selected from the group consisting of an unbranched alkyl group containing from 8 to 18 carbon atoms in the carbon chain, and each of $R_2$ and $R_3$ is a member selected from the group consisting of H, $CH_3$ an unbranched alkyl group containing from 8 to 18 carbon atoms in the carbon chain and butyric acid.

15. An etching liquid as set forth in claim 11 wherein the filming agent further includes a sulfonated anionic surfactant.

16. An etching liquid as set forth in claim 11 wherein the filming agent further includes up to 15% by weight on the basis of the filming agent of an anionic sulfonate from the class consisting of sulfonated petroleum oils, sulfonated alkyl (C4–18) benzene, sulfonated alkyl (C4–18) naphthalene and sulfonated oleic acid and its esters.

17. An etching liquid as set forth in claim 11 wherein the filming agent further includes an alkyl quaternary fatty amine.

18. An etching liquid as set forth in claim 11 wherein the filming agent further includes up to 10% by weight on the basis of the filming agent of an alkyl quaternary fatty amine having the formula

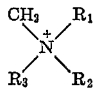

where $R_1$ is a member selected from the group consisting of an alkyl having from 8 to 18 carbon atoms in the carbon chain, $R_2$ is a member selected from the group consisting of $CH_3$, cyclic and alkyl groups having from 8 to 18 carbon atoms in the carbon chain, and $R_3$ is a member selected from the group consisting of $CH_3$ and having from 8 to 18 carbon atoms in the carbon chain, and salts thereof.

19. An etching liquid as set forth in claim 11 wherein the filming agent further includes a fatty carboxylic acid.

20. An etching liquid as set forth in claim 11 wherein the filming agent further includes up to 10% by weight on the basis of the filming agent of a fatty carboxylic acid having the formula

RCOOH where R is an alkyl or alkylene group having from 8 to 18 carbon atoms in the group of the straight or branched chain type.

21. An etching liquid as set forth in claim 11 wherein the filming agent further includes a glycol ether.

22. An etching liquid as set forth in claim 11 wherein the filming agent further includes up to 50% by weight on the basis of the filming agent of a glycol ether selected from the group consisting of alkyl ethers of ethylene glycol, diethylene glycol and triethylene glycol, and 1-butoxyethoxy-2-propanol.

23. A method of etching a patterned-resist-protected surface of an aluminum object comprising directing onto such surface substantially perpendicularly thereto an etching liquid of a two-phase dispersion constituting an etchant and a filming agent, said etchant including water, ferric chloride, a water soluble cupric salt, a water soluble thiocyanate salt and free hydrochloric acid, said filming agent including a liquid water immiscible hydrocarbon fraction and surfactants.

24. An etching method as set forth in claim 23 wherein the filming agent is present in an amount of from about 1% to about 14% by volume of the etching liquid, the remainder of the liquid constituting the etchant.

25. An etching method as set forth in claim 24 wherein the ferric chloride is present in an amount from 150 grams, anhydrous, per liter of etching liquid to the solubility limit thereof.

26. An etching method as set forth in claim 25 wherein the free hydrochloric acid is present in an amount of from about 0.2% to about 12.5% by weight of the ferric chloride, the hydrochloric acid being considered on a concentrated basis and the ferric chloride being considered on an anhydrous basis.

27. An etching method as set forth in claim 26 wherein the hydrocarbon fraction constitutes from about 40% to about 95% by volume of the filming agent.

28. An etching method as set forth in claim 27 wherein the cupric salt contains as copper from about 0.1 to about 70 grams per liter of the etching liquid and the thiocyanate salt contains as thiocyanate from about 0.001 to about 2.5 grams per liter of the etching liquid.

29. An etching method as set forth in claim 28 wherein the hydrocarbon fraction is principally aromatic.

30. An etching method as set forth in claim 28 wherein the hydrocarbon fraction includes up to 100% of an aliphatic petroleum fraction, the balance being aromatic.

31. An etching method as set forth in claim 28 wherein the etchant includes sulfuric acid.

32. An etching method as set forth in claim 28 wherein the etchant includes sulfuric acid up to about 25% by volume of the etchant on a concentrated sulfuric acid basis.

33. An etching method as set forth in claim 32 wherein the filming agent includes a phosphorylated ethoxylated ester and an ethoxylated amine.

34. An etching method as set forth in claim 33 wherein the phosphorylated ethoxylated ester is present in an amount of from about 3% to about 25% by weight of the filming agent and is an ester of orthophosphoric acid and a compound selected from the group consisting of ethoxylated aliphatic alcohols and ethoxylated alkyl phenols, being a mixture of mono- and di-phosphate esters having the formula

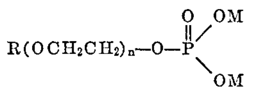

for the mono-phosphate ester, and the formula

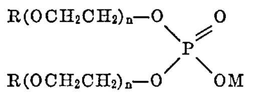

for the di-phosphate ester, where R is a member selected from the group consisting of alkyl phenol residues and aliphatic alcohol residues in which the non-aromatic portions thereof have from 8 to 24 carbon atoms, preferably are saturated, and are branched and unbranched, M is H, Na, K or $NH_3$, and *n* is an integer from 1 to 20, the ethoxylation being between 40% and 90%, and wherein the ethoxylated amine is present in an amount of from about 1% to about 20% by weight of the filming agent and is a polyethoxylated mono- and di-amine having the formula

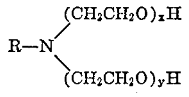

for the polyethoxylated monoamine, where $x+y$ is an integer ranging from 2 to 50 and where R is an alkyl group having from 8 to 18 carbon atoms in the carbon chain, and the formula

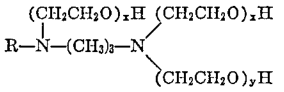

for the polyethoxylated diamine, where $x+y+z$ is an integer ranging from 3 to 80, R being an alkyl group having from 8 to 18 carbon atoms in the carbon chain.

35. An etching method as set forth in claim 33 wherein the filming agent further includes a fatty amine.

36. An etching method as set forth in claim 33 wherein the filming agent further includes up to about 3% by weight on the basis of the filming agent of a fatty amine having the formula

where $R_1$ is a member selected from the group consisting of an unbranched alkyl group containing from 8 to 18 carbon atoms in the carbon chain, and each of $R_2$ and $R_3$ is a member selected from the group consisting of H, $CH_3$ an unbranched alkyl group containing from 8 to 18 carbon atoms in the carbon chain and butyric acid.

37. An etching method as set forth in claim 33 wherein the filming agent further includes a sulfonated anionic surfactant.

38. An etching method as set forth in claim 33 wherein the filming agent further includes up to 15% by weight on the basis of the filming agent of an anionic sulfonate from the class consisting of sulfonated petroleum oils, sulfonated alkyl (C4–18) benzene, sulfonated alkyl (C4–18) naphthalene and sulfonated oleic acid and its esters.

39. An etching method as set forth in claim 33 wherein the filming agent further includes an alkyl quaternary fatty amine.

40. An etching method as set forth in claim 33 wherein the filming agent further includes up to 10% by weight on the basis of the filming agent of an alkyl quaternary fatty amine having the formula

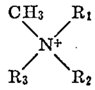

where $R_1$ is a member selected from the group consisting of an alkyl having from 8 to 18 carbon atoms in the carbon chain, $R_2$ is a member selected from the group consisting of $CH_3$, cyclic and alkyl groups having from 8 to 18 carbon atoms in the carbon chain, and $R_3$ is a member selected from the group consisting of $CH_3$ and having from 8 to 18 carbon atoms in the carbon chain, and salts thereof.

41. An etching method as set forth in claim 33 wherein the filming agent further includes a fatty carboxylic acid.

42. An etching method as set forth in claim 33 wherein the filming agent further includes up to 10% by weight on the basis of the filming agent of a fatty carboxylic acid having the formula

RCOOH where R is an alkyl or alkylene group having from 8 to 18 carbon atoms in the group of the straight or branched chain type.

43. An etching method as set forth in claim 33 wherein the filming agent further includes a glycol ether.

44. An etching method as set forth in claim 33 wherein the filming agent further includes up to 50% by weight on the basis of the filming agent of a glycol ether selected from the group consisting of alkyl ethers of ethylene glycol, diethylene glycol and triethylene glycol, and 1-butoxyethoxy-2-propanol.

References Cited

UNITED STATES PATENTS

| | | | |
|---|---|---|---|
| 3,607,484 | 9/1971 | Marukawa et al. | 156—14 |
| 3,402,083 | 9/1968 | Patsko et al. | 156—14 |
| 3,367,875 | 2/1968 | Sherer et al. | 156—14 |
| 3,009,849 | 11/1961 | Bellinger | 156—21 |
| 3,314,812 | 4/1967 | Mitchell | 252—79.1 |
| 3,340,195 | 9/1967 | Borth et al. | 252—79.1 |

ALFRED L. LEAVITT, Primary Examiner

J. MASSIE, Assistant Examiner

U.S. Cl. X.R.

156—14, 22; 252—79.2, 79.4